US011612115B2

(12) United States Patent
Pfoltner et al.

(10) Patent No.: US 11,612,115 B2
(45) Date of Patent: Mar. 28, 2023

(54) STUMP CUTTER DRIVE SYSTEM

(71) Applicant: Vermeer Manufacturing Company, Pella, IA (US)

(72) Inventors: Chris Pfoltner, Knoxville, IA (US); David Alexander, Indianola, IA (US); Jesse Munk, Reasnor, IA (US); Scott Rempe, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 17/226,463

(22) Filed: Apr. 9, 2021

(65) Prior Publication Data

US 2021/0321579 A1 Oct. 21, 2021

Related U.S. Application Data

(60) Provisional application No. 63/035,215, filed on Jun. 5, 2020, provisional application No. 63/010,199, filed on Apr. 15, 2020.

(51) Int. Cl.
*A01G 23/06* (2006.01)
(52) U.S. Cl.
CPC .................. *A01G 23/067* (2013.01)
(58) Field of Classification Search
CPC .............................. A01G 23/06; A01G 23/067
See application file for complete search history.

(56) References Cited

U.S. PATENT DOCUMENTS

| 3,044,509 | A | 7/1962 | Kehler |
| 3,557,892 | A | 1/1971 | Burrough |
| 4,271,879 | A | 6/1981 | Shivers, Jr. et al. |
| 4,858,415 | A | 8/1989 | Hake |

(Continued)

FOREIGN PATENT DOCUMENTS

| AU | 5810473 A | 1/1975 |
| DE | 102004035626 A1 | 3/2005 |

(Continued)

OTHER PUBLICATIONS

Extended Search Report issued from the European Patent Office for related Application No. EP21168328 dated Sep. 17, 2021 (9 Pages).

(Continued)

*Primary Examiner* — Matthew Katcoff
(74) *Attorney, Agent, or Firm* — Michael Best & Friedrich LLP

(57) ABSTRACT

A stump cutter includes a cutter wheel rotatable about a cutter wheel axis, the cutter wheel supported by a boom for sweep movements about a vertical cutter wheel sweep axis, and the cutter wheel is supported by the boom for tilt movements about a horizontal cutter wheel tilt axis. A prime mover is configured to drive the cutter wheel about the cutter wheel axis. A mechanical driveline provides power transmission from the prime mover to the cutter wheel, the mechanical driveline including a final drive cutter wheel gearbox positioned along the cutter wheel axis, and a swivel gearbox assembly including two right angle gearboxes joined with a swivel joint therebetween. The swivel joint between the two right angle gearboxes forms a driveline swivel axis. A downstream one of the two right angle gearboxes includes an output shaft connected to an input shaft of the final drive cutter wheel gearbox.

25 Claims, 44 Drawing Sheets

(56) References Cited

U.S. PATENT DOCUMENTS

| | | | |
|---|---|---|---|
| 5,272,859 | A | 12/1993 | Pruitt et al. |
| 5,355,971 | A | 10/1994 | Austin et al. |
| 5,421,754 | A | 6/1995 | Lund-Andersen |
| 5,435,359 | A | 7/1995 | Craft |
| 5,531,283 | A | 7/1996 | Austin et al. |
| 5,655,581 | A | 8/1997 | Craft |
| 5,657,803 | A | 8/1997 | Kappel et al. |
| 5,706,901 | A | 1/1998 | Walters et al. |
| RE35,835 | E | 7/1998 | Eidam et al. |
| 5,829,497 | A | 11/1998 | Maroney |
| 5,887,634 | A | 3/1999 | Theisen |
| 5,916,112 | A | 6/1999 | Stiefvater et al. |
| 6,003,570 | A | 12/1999 | Kilpatrick |
| 6,305,445 | B1 | 10/2001 | Falatok |
| 6,412,570 | B1 | 7/2002 | Pruitt et al. |
| 6,776,432 | B2 | 8/2004 | Harkcom et al. |
| 7,150,300 | B1 | 12/2006 | Peterson |
| 7,232,000 | B2 | 6/2007 | Brossard |
| 8,109,303 | B1 | 2/2012 | Holmes |
| 8,256,198 | B2 | 9/2012 | Thompson |
| 8,469,386 | B2 | 6/2013 | Clark et al. |
| 8,783,308 | B2 | 7/2014 | Kappel et al. |
| 2006/0255193 | A1 | 11/2006 | Hoekstra et al. |
| 2009/0101234 | A1 | 4/2009 | Hart |
| 2012/0144793 | A1 | 6/2012 | Clark et al. |
| 2014/0283950 | A1 | 9/2014 | Kappel et al. |
| 2016/0183481 | A1 | 6/2016 | Barreto |

FOREIGN PATENT DOCUMENTS

| | | |
|---|---|---|
| GB | 709507 A | 5/1954 |
| GB | 2293303 A | 3/1996 |

OTHER PUBLICATIONS

Wikipedia, "Universal joint", website: https://en.wikipedia.org/wiki/Universal_joint, last edited on Jul. 1, 2021 (9 Pages).

Wikipedia, "Constant-velocity joint", website: https://en.wikipedia.org/wiki/Constant-velocity_joint, last edited on Jun. 29, 2021 (7 Pages).

Wikipedia, "Gimbel", website: https://en.wikipedia.org/wiki/Gimbal, last edited on Mar. 5, 2021 (6 Pages).

Carlton, "SP7015 Series Self-Propelled Stump Cutters", website: https://www.stumpcutters.com/stump-cutters/sp7015-series-self-propelled-stump-cutters/, Copyright 2002-2021 (7 Pages).

MilllerGrinder Pro75T Stump Grinders, also Pro100T & Pro150T on sale on or before Mar. 6, 2020 (1 Page).

Diamond Mowers, website: https://diamondmowers.com/products/ Copyright 2021, (11 Pages).

YouTube Video, Shaver Stumpbuster, website:https://www.youtube.com/watch?time_continue=1&v=TRrH8X83k7M, May 8, 2009, (7 Pages).

Krone North America, "EasyCut 6210 CV", website: https://www.krone-northamerica.com/english/krone-produkte/disc-mowers/pull-type-mowers-easycut/easycut-6210-cv/, copyright 2021 (3 Pages).

Deere, "equal-angle hitch" website: http://salesmanual.deere.com/sales/salesmanual/en_NA/hay_forage/2010/feature/mower_conditioners/hitch/625_series_equal_angle_hitch.html, Last Updated Sep. 27, 2010 (1 Page).

Vermeer, TM1410 Trailer Mower, Drawing Published Nov. 14, 2016 (1 Page).

Belman, "Advantages of Gimbal Bellows Expansion Joints", website: https://www.belman.com/project/advantages-of-gimbal-bellows/, 2017, (4 Pages).

Senior Flexonics Pathway, "Gimbaled Expansion Joint" website: https://sfpathway.com/gimbaled-expansion-joints/, 2018, (2 Pages).

Extended Search Report issued from the European Patent Office for related Application No. EP21171980.2 dated Nov. 5, 2021 (9 Pages).

STUMP CUTTER DRIVE SYSTEM

CROSS-REFERENCE TO RELATED APPLICATIONS

The present application claims priority to U.S. Provisional Patent Application No. 63/010,199, filed Apr. 15, 2020, and U.S. Provisional Patent Application No. 63/035,215, filed Jun. 5, 2020, the entire contents of both of which are incorporated by reference herein.

BACKGROUND

The present invention relates to machines for material reduction of tree stumps by cutting and/or grinding, and more particularly to a drive system for such machines.

Conventional stump cutters are well known. These machines commonly include a rotating cutter wheel driven by a prime mover (e.g., a gas or diesel engine). The cutter wheel, while rotating, is advanced toward the stump and moved laterally across the face of the stump to reduce the stump material by cutting and/or grinding. Often, the cutter wheel is automatically advanced across the face of the stump in a sweeping motion. The cutter wheel is mounted to one end of a boom which is, in turn, pivotally mounted on a support frame. Hydraulic boom swing cylinders are used to pivot the boom about the pivot point to move the cutter wheel back and forth across the face of the stump to reduce it. Advancing the cutter wheel toward the stump is accomplished by separate hydraulic tilt cylinders that causes the boom to tilt within a vertical plane.

In some stump cutters, the engine is operably connected to the cutter wheel by belts that facilitate rotation of the cutter wheel. In other stump cutters, the engine powers a hydraulic pump that in turn drives a hydraulic motor coupled to the cutter wheel. Despite the nature of the power transmission connection, between the prime mover and the cutter wheel, careful design consideration is required to accommodate the unique operational movement requirements of the boom. In some cases, the prime mover can be directly located on the boom to alleviate complications associated with power transmission through an articulating structure, however, this may reduce stability and may limit the acceptable range of motion, for example, operating an internal combustion engine at a significant angle from horizontal is undesirable and may limit engine options.

SUMMARY

In one aspect, the invention provides a stump cutter including a boom-mounted cutter wheel rotatable about a cutter wheel axis. The cutter wheel is supported by a boom for sweep movements about a vertical cutter wheel sweep axis so that the cutter wheel sweeps along an arcuate path within a horizontal plane. The cutter wheel is supported by the boom for tilt movements about a horizontal cutter wheel tilt axis so that the cutter wheel tilts along an arcuate path within a vertical plane. A prime mover is configured to drive the cutter wheel about the cutter wheel axis. A mechanical driveline is configured to provide power transmission from the prime mover to the cutter wheel. The mechanical driveline includes a final drive cutter wheel gearbox positioned along the cutter wheel axis, and a swivel gearbox assembly including two right angle gearboxes joined with a swivel joint therebetween. The swivel joint between the two right angle gearboxes forms a driveline swivel axis. A downstream one of the two right angle gearboxes includes an output shaft connected to an input shaft of the final drive cutter wheel gearbox.

In another aspect, the invention provides a stump cutter including a mainframe and an engine supported on the mainframe such that a crankshaft of the engine extends horizontally when the stump cutter is situated in an operative position on a horizontal ground surface. A cutter wheel support structure extends from the mainframe to support a cutter wheel at a distance from the mainframe, the cutter wheel support structure having: a sweep subframe pivotally connected to the mainframe defining a vertical cutter wheel sweep axis, and a tilt subframe pivotally connected to the sweep subframe defining a horizontal cutter wheel tilt axis on one end and with a cutter wheel right angle gearbox mounted to the opposite end with an output shaft for supporting the cutter wheel and an input shaft. A jointed driveline include a first right angle gearbox fixedly secured with respect to the engine and having a horizontal input shaft connected to the engine crankshaft, wherein a vertical output shaft of the first right angle gearbox defines a driveline sweep axis parallel to the cutter wheel sweep axis. The jointed driveline includes a second right angle gearbox pivotally mounted on the first right angle gearbox about the driveline sweep axis, wherein the second right angle gearbox includes a horizontal output shaft, defining a driveline tilt axis parallel to the cutter wheel tilt axis. The jointed driveline includes a third right angle gearbox pivotally mounted on the second right angle gearbox about the driveline tilt axis, wherein the third right angle gearbox includes an output shaft extending in a direction toward the cutter wheel right angle gearbox. A driveshaft is configured to provide power transmission from the output shaft of the third right angle gearbox to the input shaft of the cutter wheel right angle gearbox. A gearbox alignment structure extends along the driveshaft and has a first portion fixed to the cutter wheel right angle gearbox and a second portion fixed to the third right angle gearbox and configured to limit misalignment between the input shaft of the cutter wheel right angle gearbox and the output shaft of the third right angle gearbox so that the orientation of the second right angle gearbox relative to the first right angle gearbox about the driveline sweep axis, and the orientation of the third right angle gearbox relative to the second right angle gearbox about the driveline tilt axis are controlled by the combination of the driveshaft and the gearbox alignment structure when the cutter wheel support structure moves relative to the mainframe about the cutter wheel sweep and tilt axes.

In yet another aspect, the invention provides a stump cutter including a prime mover supported above a ground surface by a mainframe of the stump cutter. A cutter wheel is configured to be driven about a cutter wheel axis by the prime mover. The cutter wheel is supported for sweep movements about a vertical cutter wheel sweep axis so that the cutter wheel sweeps along an arcuate path within a horizontal plane, and the cutter wheel is supported for tilt movements about a horizontal cutter wheel tilt axis so that the cutter wheel tilts along an arcuate path within a vertical plane. A mechanical driveline between the prime mover and the cutter wheel includes a first right angle gearbox including a vertical output shaft defining a driveline sweep axis parallel to the cutter wheel sweep axis; a second right angle gearbox pivotally mounted on the first right angle gearbox about the driveline sweep axis, the second right angle gearbox including a horizontal output shaft defining a driveline tilt axis; a third right angle gearbox mounted on the second right angle gearbox and including an output shaft;

and a cutter wheel right angle gearbox having an output shaft extending along the cutter wheel axis, the cutter wheel right angle gearbox having an input shaft connected to the output shaft of the third right angle gearbox.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1A:
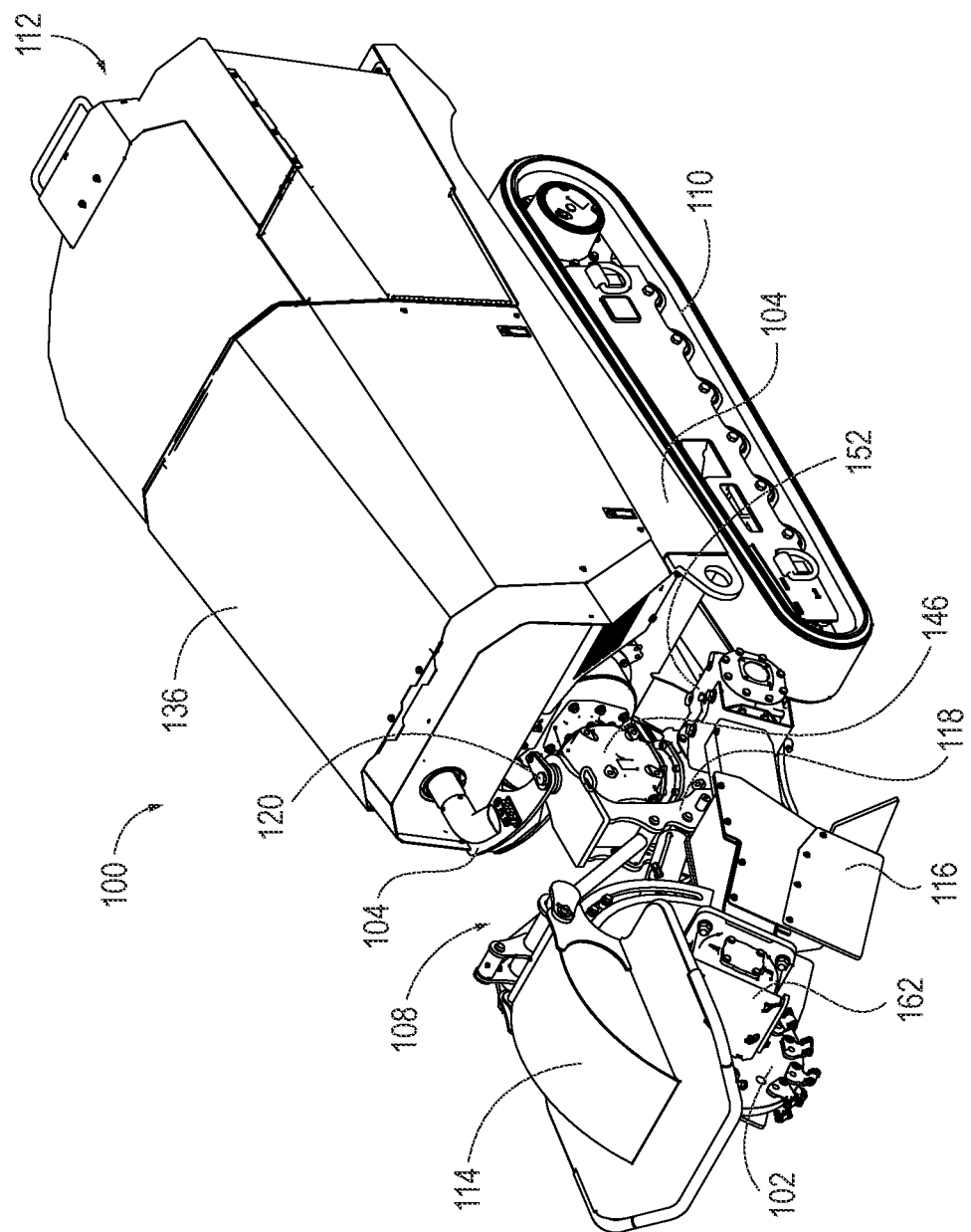
FIG. 1A is a first perspective view of a stump cutter according to a first embodiment of the present disclosure.
Figure 1B:
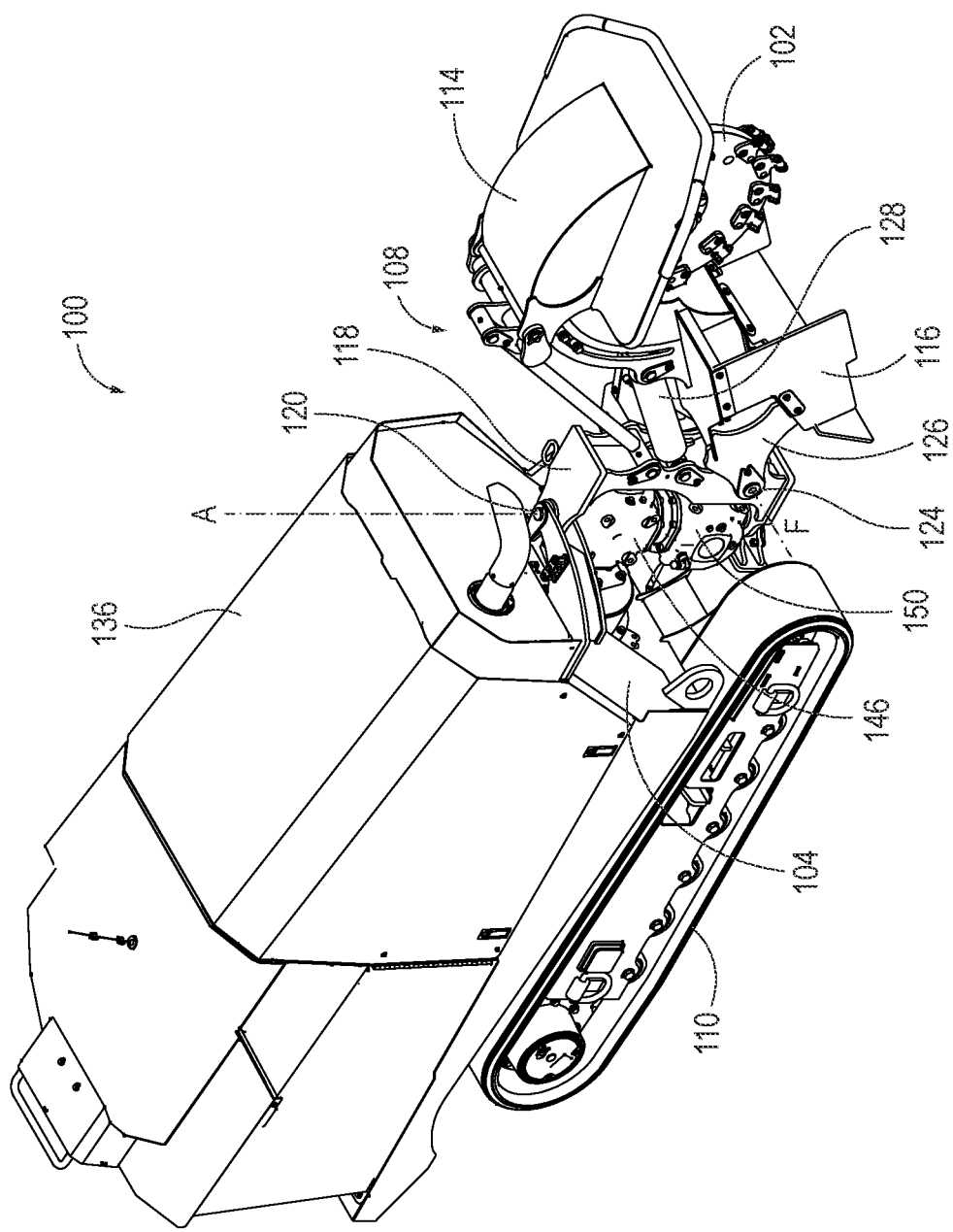
FIG. 1B is a second perspective view of the stump cutter of FIG. 1A.

FIGS. 1A and 1B illustrate a stump cutter 100 for materially reducing tree stumps by cutting and/or grinding with a rotatable cutter wheel 102. The stump cutter 100 includes a frame, or "mainframe," 104 that supports a prime mover 106 (FIG. 4) for driving the cutter wheel 102 and a movable boom 108, a distal end of which rotatably supports the cutter wheel 102. As described in detail below, the boom 108 is mounted relative to the mainframe 104 to enable motion in the horizontal plane in a first direction, herein referred to as sweep movement, moving the cutter wheel across a stump and also motion in the vertical plane, raising/lowering up/down with respect to the ground, herein referred to as tilt movement, moving the cutter wheel down as a stump is cut from the top or moving up to raise the cutter wheel for repositioning. The sweep movement as illustrated provides movement of the cutter wheel 102 along an arcuate path within a horizontal plane. The illustrated embodiment provides arcuate movement with a fixed radius, about a sweep pivot axis A. The tilt movement provides movement of the cutter wheel 102 along an arcuate path within a vertical plane. The illustrated embodiment provides arcuate movement with a fixed radius, about a tilt pivot axis F. The stump cutter 100 is movable under its own power along the ground by a ground drive system having wheels and/or tracks 110. The ground drive system enables motion of the cutter wheel in the horizontal plane in a second direction. To control operation of the stump cutter 100, including movement along the ground, drive of the cutter wheel 102, and movements of the boom 108, the stump cutter 100 can include operator controls 112. The operator controls 112 can be provided on a fixed control panel on the stump cutter 100 or may be provided on a removable and/or remote control. A cover or hood 114 covers an upper portion of the cutter wheel 102 and may be pivotable by a linkage during vertical tilting of the boom 108 so as to maintain a relatively constant orientation through the movement range of the boom 108. Additional shielding 116 may be provided to extend from the boom 108 behind and at least partially around the cutter wheel 102 to limit the throwing of chips during reduction of the stump. The stump cutter 100 is provided as an integrated or single-purpose work machine, as opposed to a detachable work implement for a tractor or other device. In other words, the boom 108 with the cutter wheel 102 and the prime mover 106 are on-board components with respect to the mainframe 104. However, aspects of the disclosure may also be provided in "mounted" stump cutters configured for attachment to a general purpose tractor, for example where the mainframe is mounted to a three-point linkage of a tractor.

Figure 2:
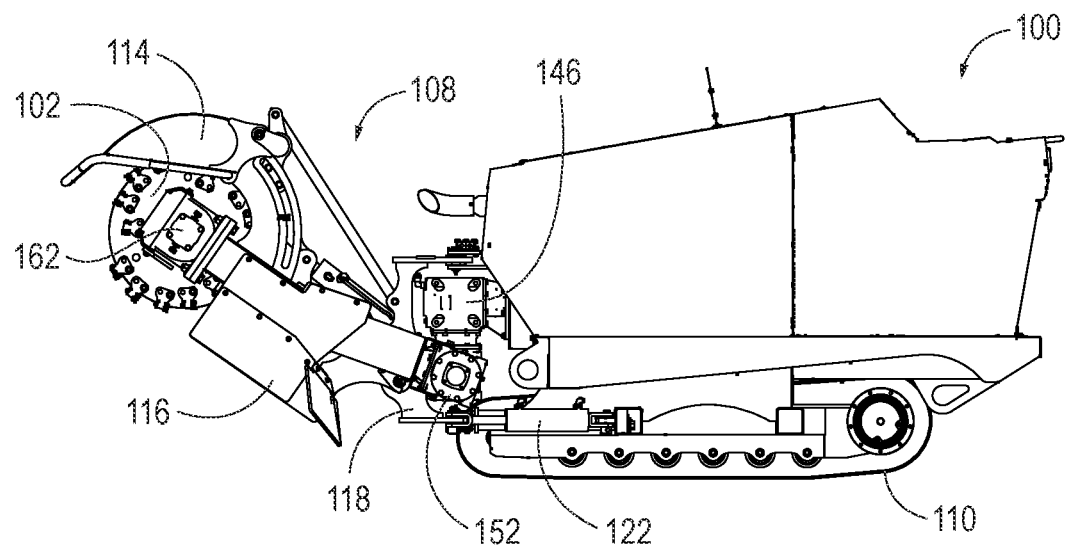
FIG. 2 is a side elevation view of the stump cutter of the first embodiment. The nearside track is removed to reveal a boom swing cylinder.
Figure 3:
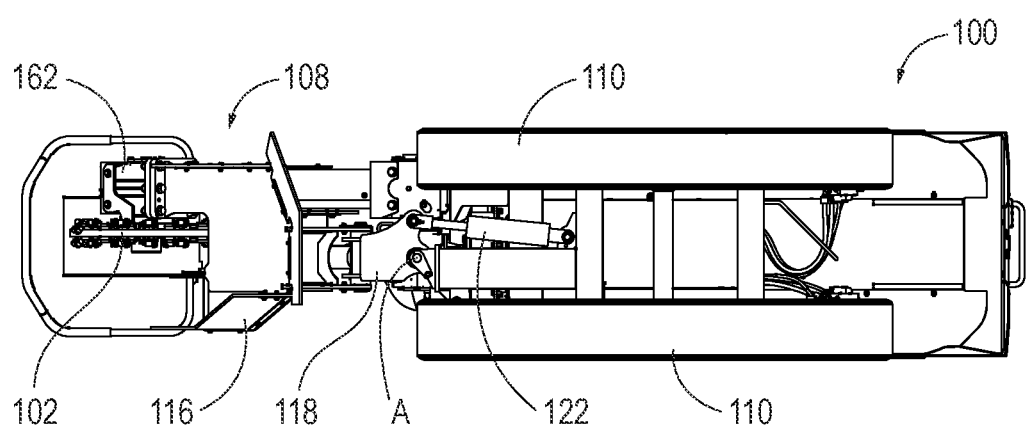
FIG. 3 is a bottom plan view of the stump cutter of the first embodiment.
Figure 6A:
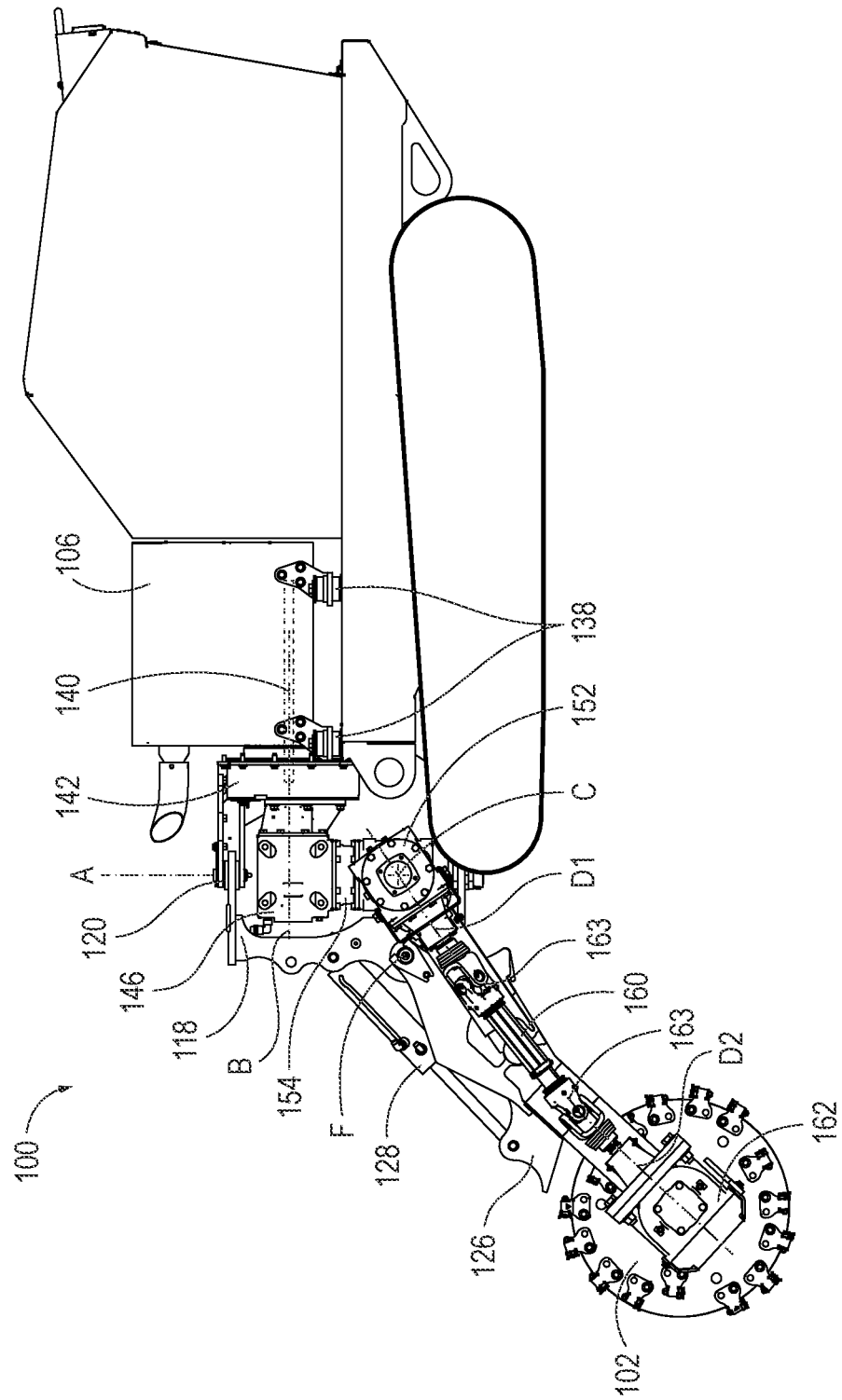
FIG. 6A is a side elevation view of the stump cutter with the boom in the position of FIG. 5.
Figure 6B:
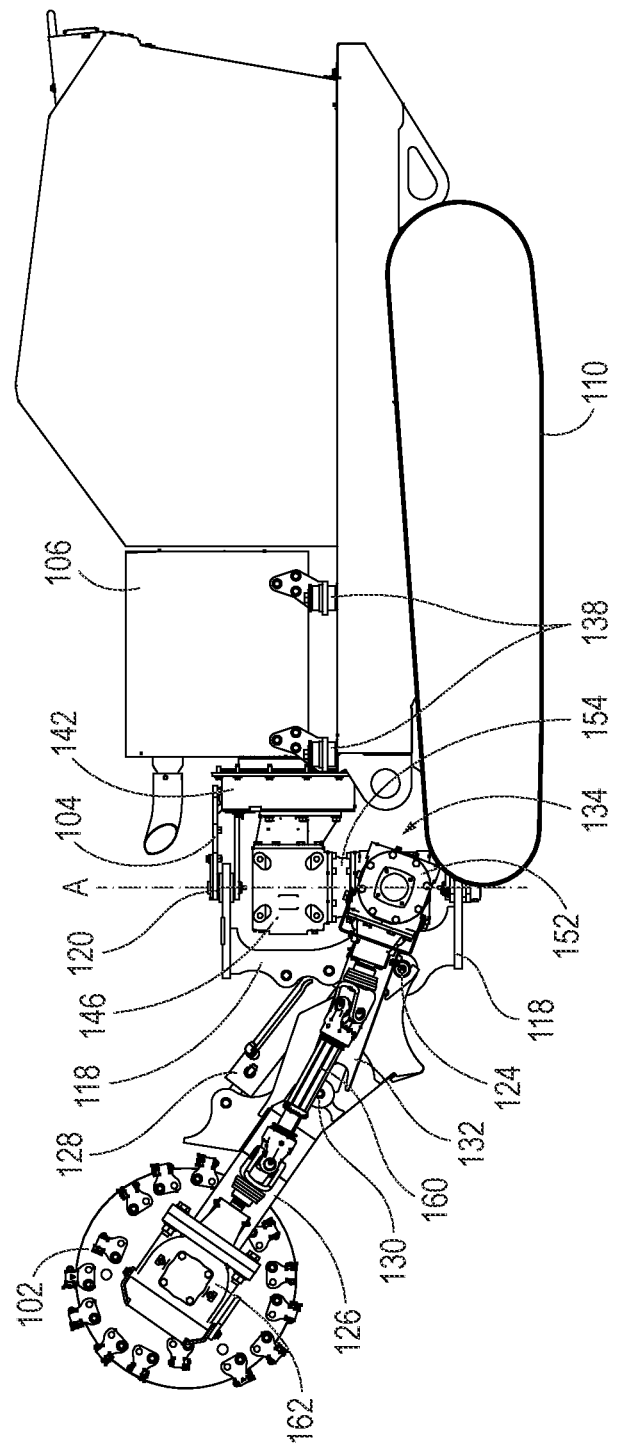
FIG. 6B is a side elevation view of the stump cutter similar to FIG. 6A, but with the boom in a raised position.
Figure 8A:
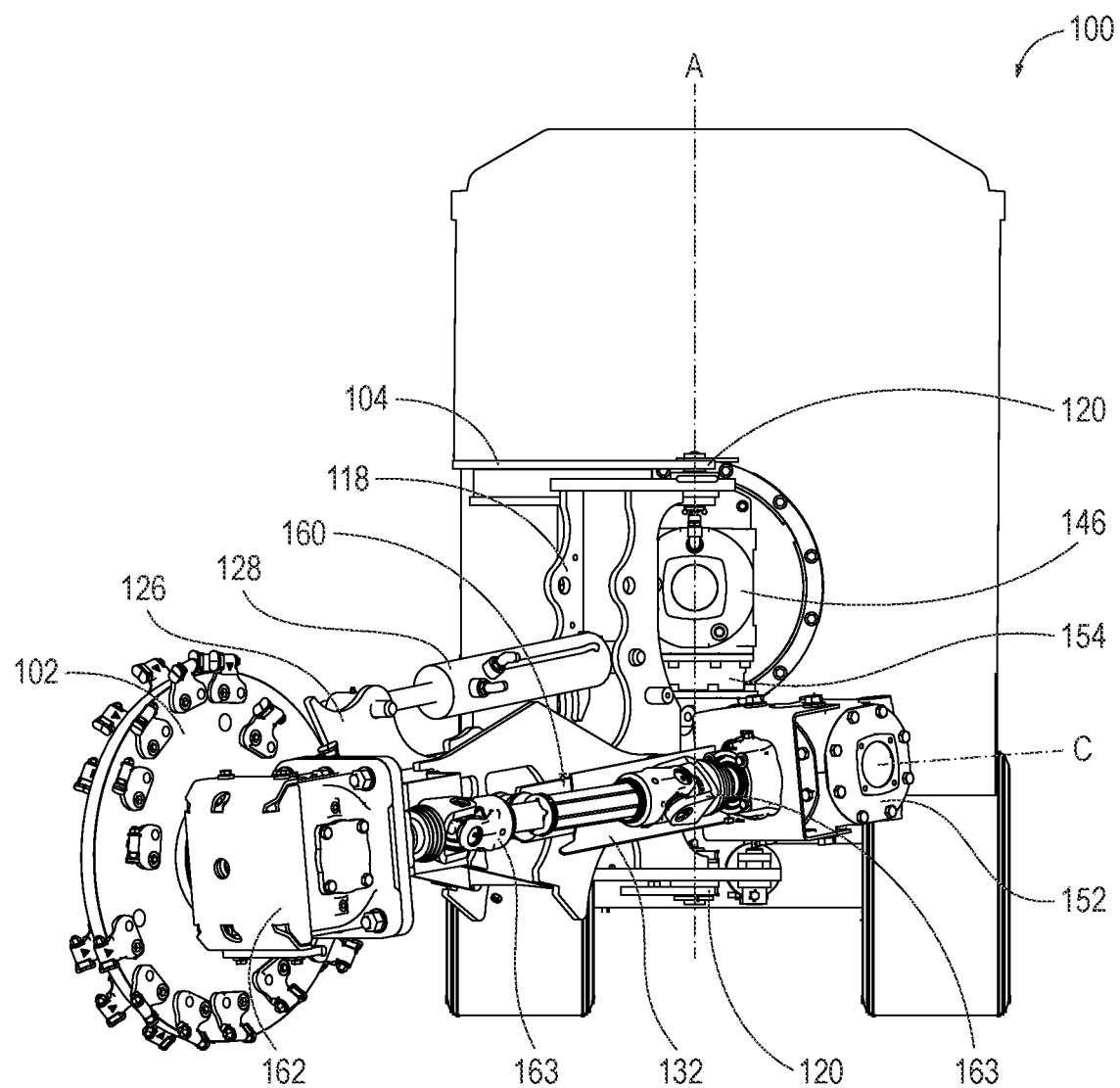
FIG. 8A is a front view of the stump cutter of the first embodiment, showing the boom swung to a left side.
Figure 8B:
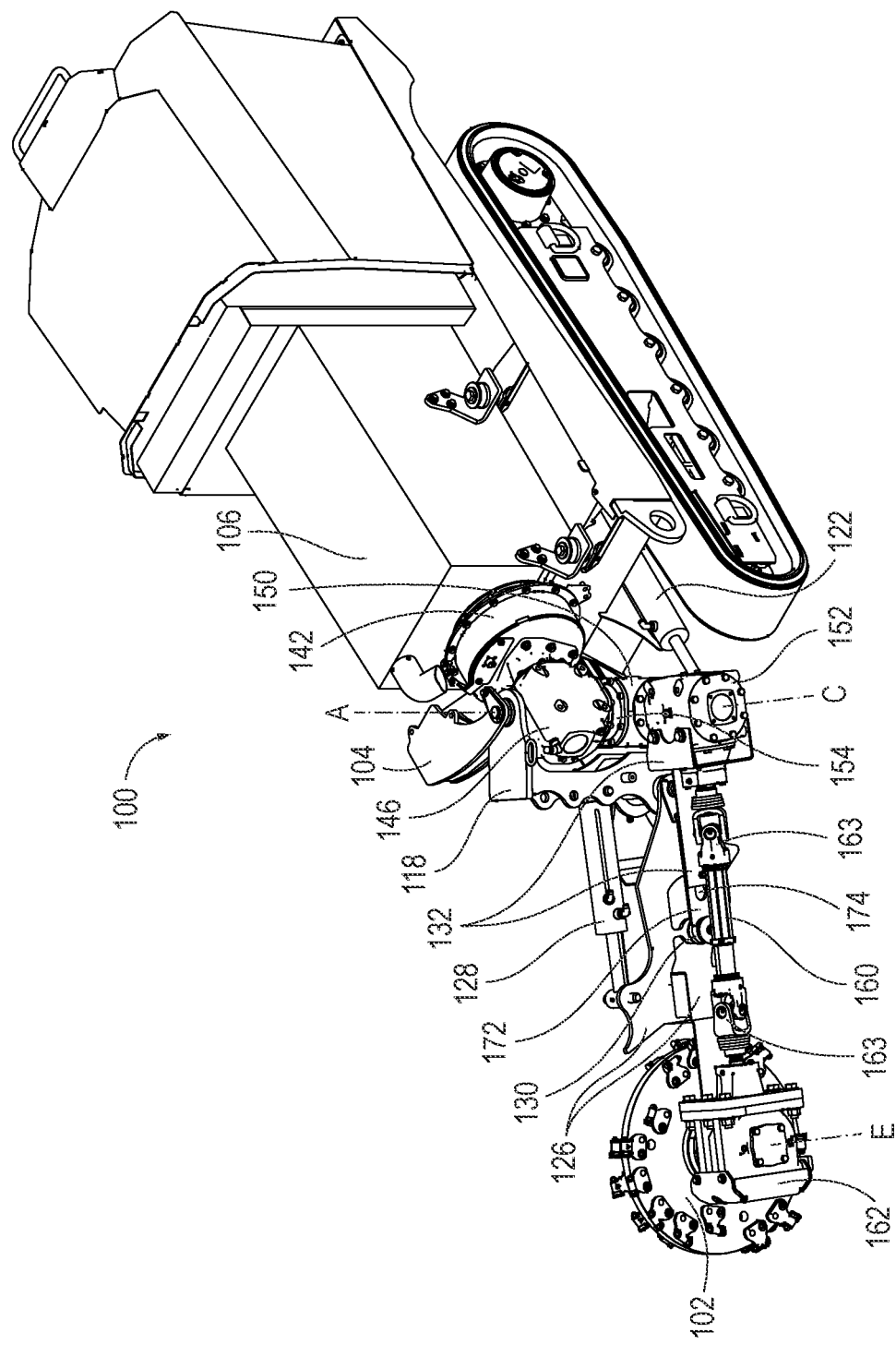
FIG. 8B is a perspective view of the stump cutter having the boom in the position of FIG. 8A.
Figure 8C:
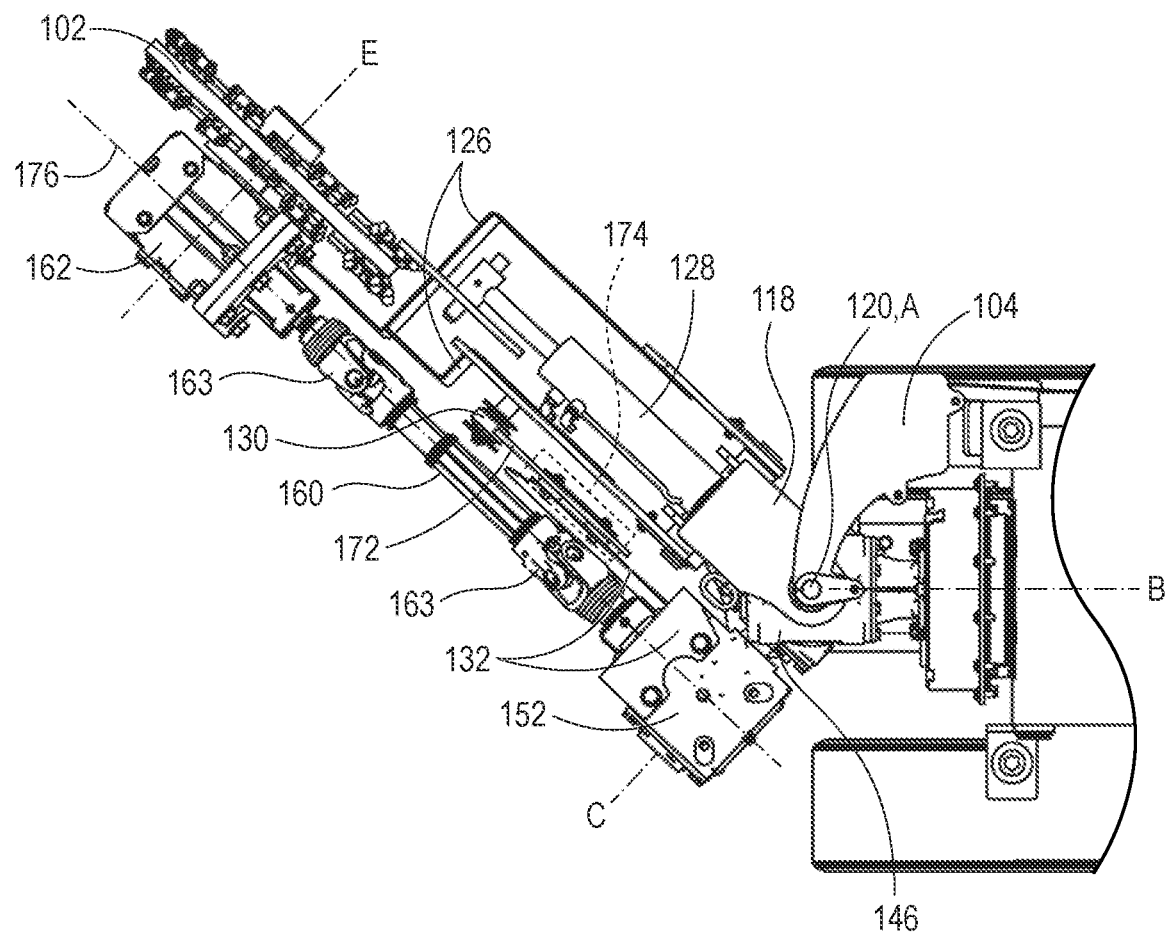
FIG. 8C is a plan view of the stump cutter having the boom in the position of FIGS. 8A and 8B.
Figure 9A:
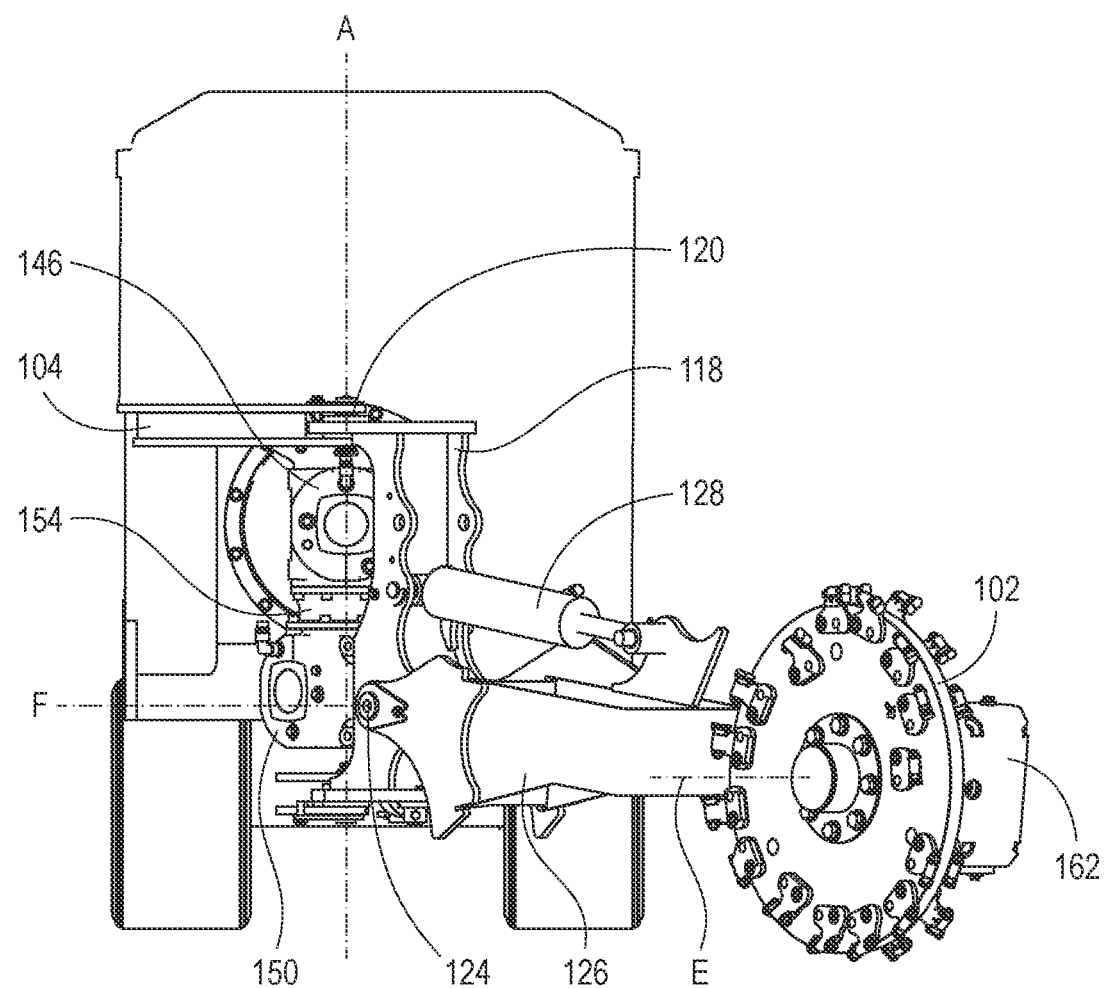
FIG. 9A is a front view of the stump cutter of the first embodiment, showing the boom swung to a right side.
Figure 9B:
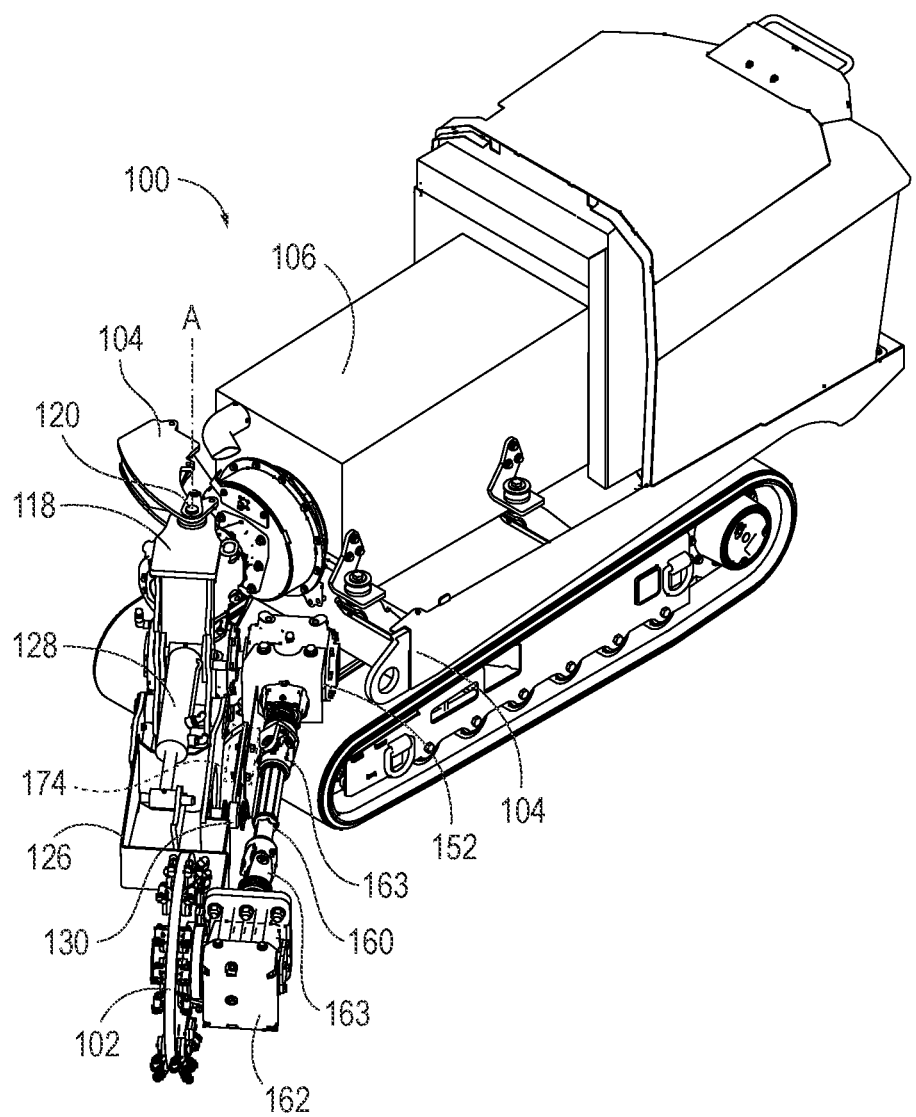
FIG. 9B is a perspective view of the stump cutter having the boom in the position of FIG. 9A.
Figure 9C:
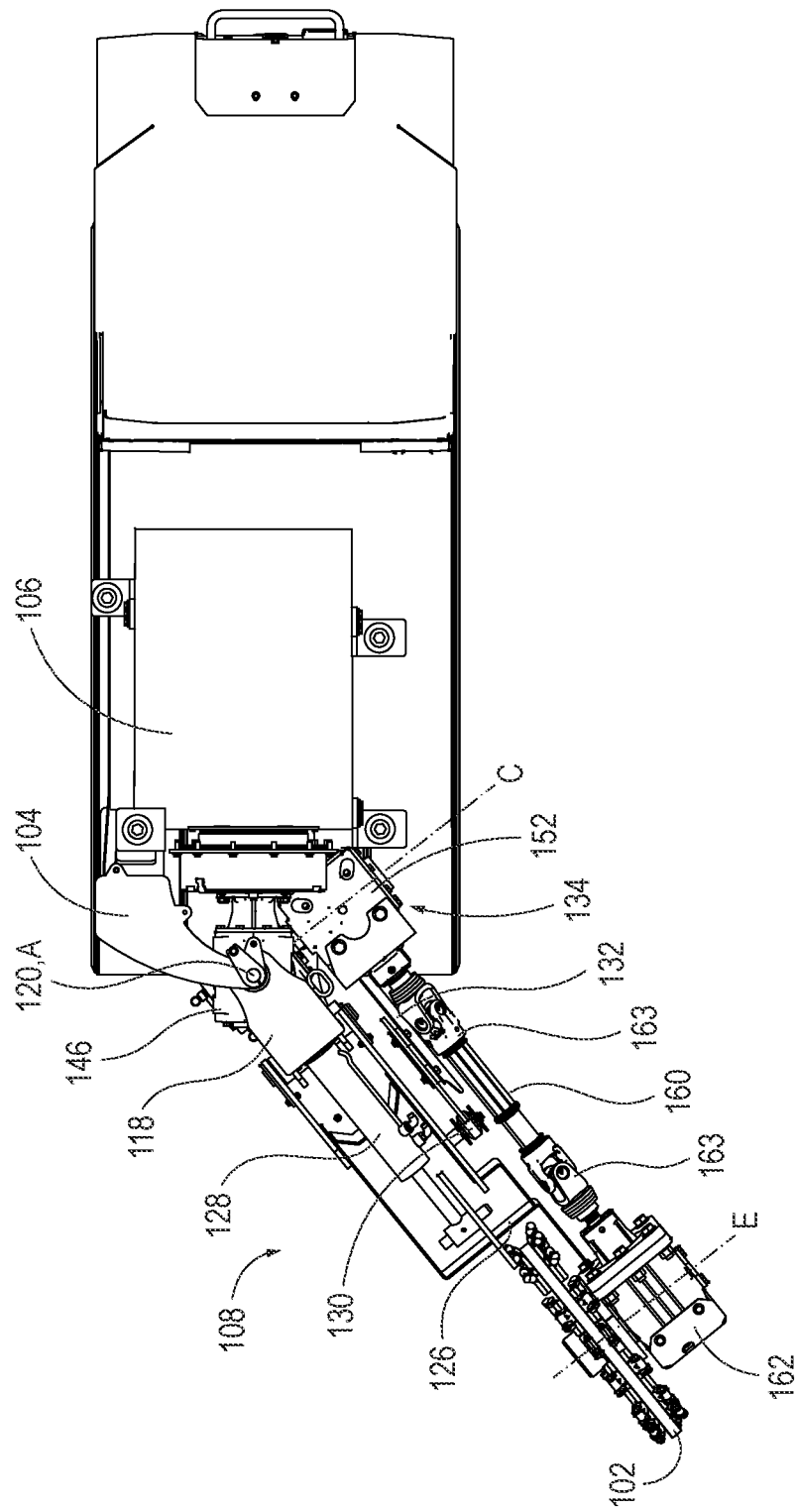
FIG. 9C is a plan view of the stump cutter having the boom in the position of FIGS. 9A and 9B.

For horizontal direction sweeping, the boom 108 includes a sweep subframe 118 pivotally coupled to the mainframe 104 about a vertical sweep axis A (FIGS. 1B and 3), or "cutter wheel sweep axis" about which the cutter wheel 102 is configured to sweep. The sweep subframe 118 has a C-shape profile providing separate upper and lower pivot joints 120 with the mainframe 104. Sweep motion of the boom 108 is carried out in response to actuation (extension or retraction) of a sweep cylinder 122 (FIGS. 2 and 3) mounted between the mainframe 104 and the sweep subframe 118. For vertical cutter wheel movement, which may be referred to as tilt or lift, a pivot joint 124 is provided between a boom tilt subframe 126 and the sweep subframe 118. The tilt subframe 126 supports the cutter wheel 102 at an end opposite the pivot joint 124. As such, the cutter wheel 102 tilts about a horizontal axis F (FIGS. 1B and 4), or "cutter wheel tilt axis" through the pivot joint 124. Tilt motion of the tilt subframe 126 is carried out in response to actuation (extension or retraction) of a tilt cylinder 128 mounted between the sweep subframe 118 and the tilt subframe 126. The sweep and tilt cylinders 122, 128 can be operated by hydraulic oil through at least one control valve assembly and at least one hydraulic pump (not shown) supported on the mainframe 104. As shown in FIGS. 6A and 6B, the tilt range can be 30 degrees or more upward from horizontal, and 40 degrees or more downward from horizontal. As shown in FIGS. 8C and 9C, the sweep range can be 35 degrees or more to either side from center. As discussed in further detail below, the tilt subframe 126 forms a pivot joint 130 with a driveline alignment frame 132 extending from a portion of a multi-gearbox transmission 134. In the illustrated construction, the pivot joint 130 is provided by a ball joint.

Figure 4:
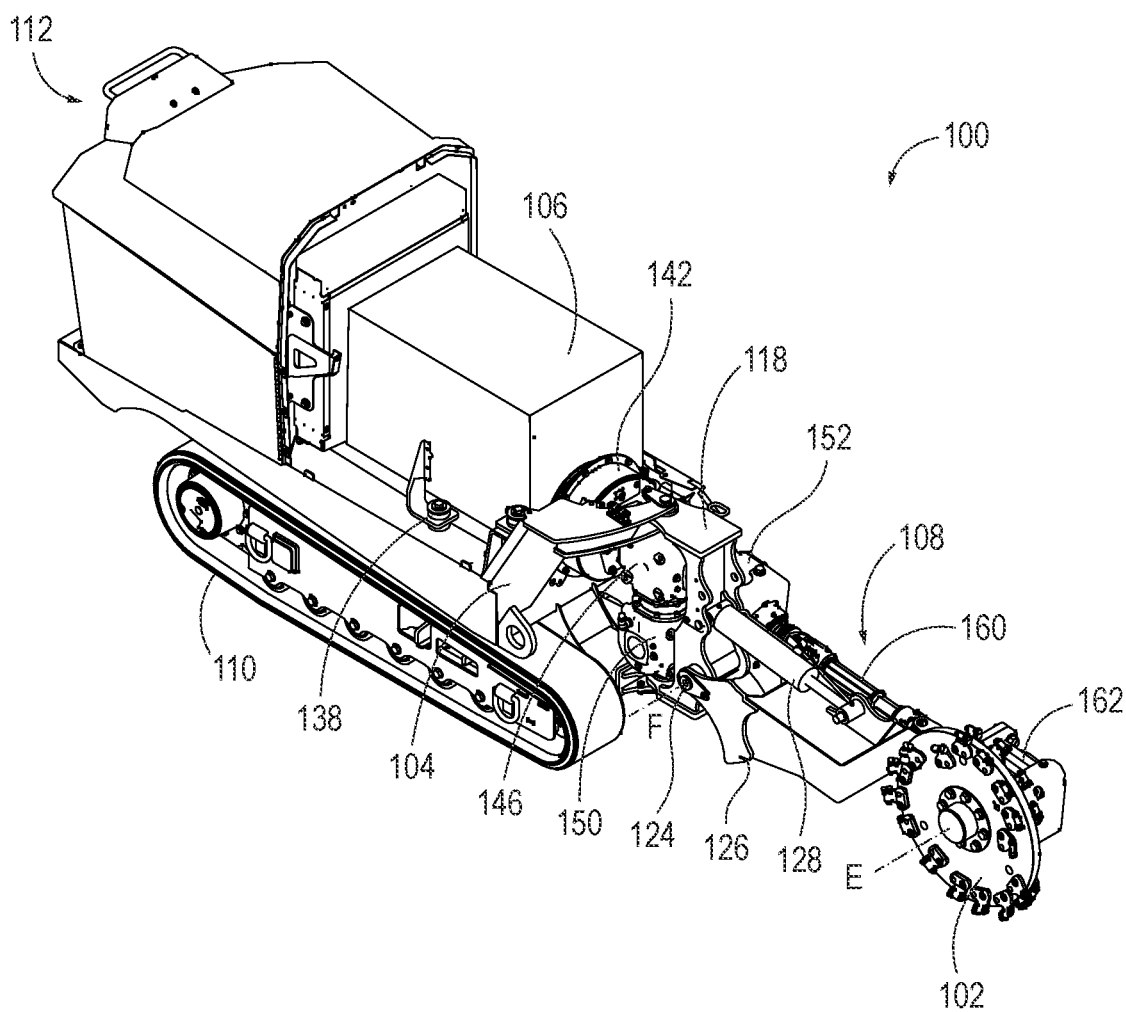
FIG. 4 is a perspective view of the stump cutter of the first embodiment. Numerous housings, covers, and shielding pieces are removed to reveal the underlying mechanicals.
Figure 10A:
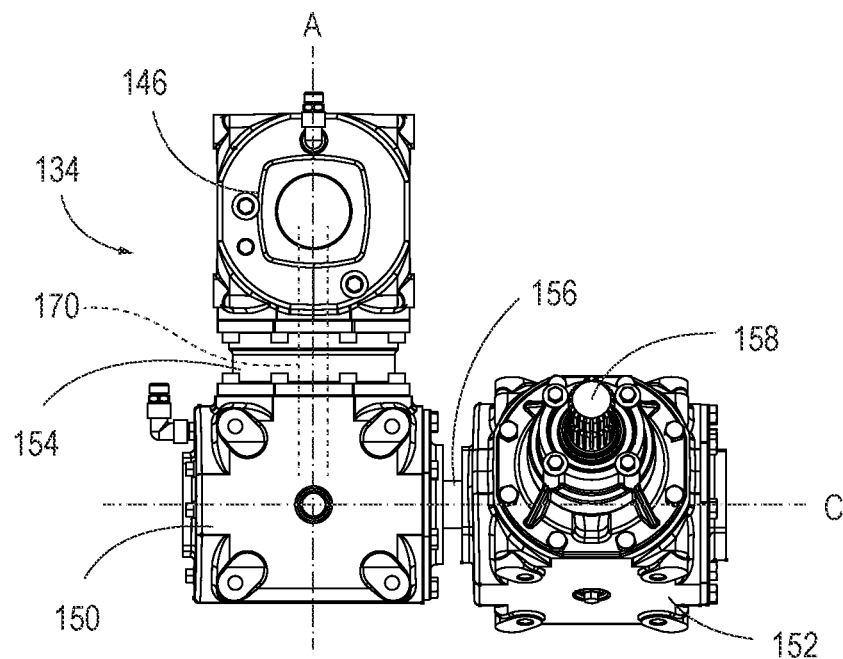
FIG. 10A is a front view of a gear-drive transmission of the stump cutter of the first embodiment.
Figure 10B:
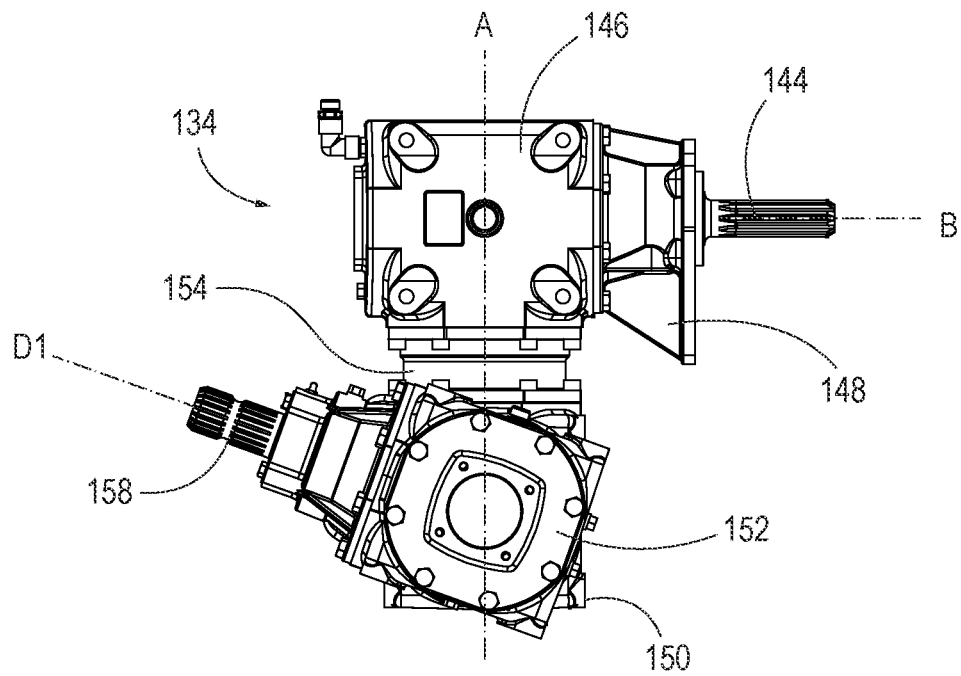
FIG. 10B is a right side elevation view of the gear-drive transmission of FIG. 10A.
Figure 10C:
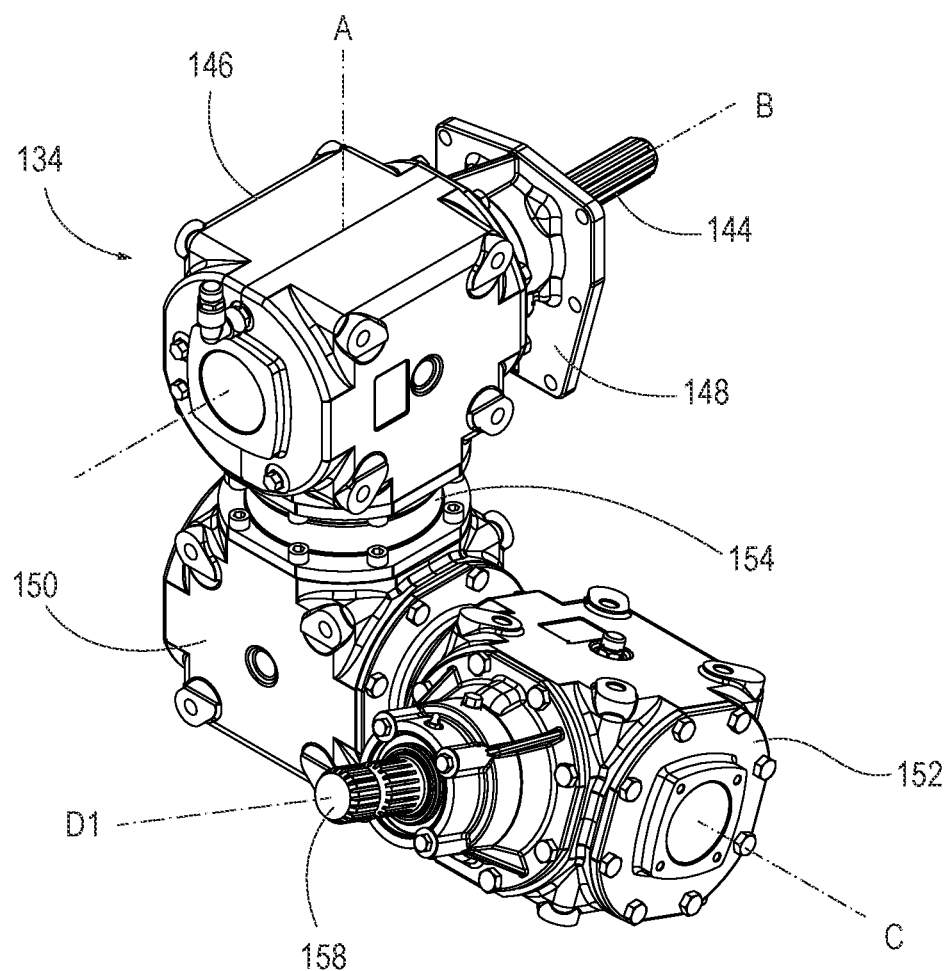
FIG. 10C is a perspective view of the gear-drive transmission of FIGS. 10A and 10B.

From FIG. 4 onward, an engine cover 136 is removed, among other parts, to better illustrate a driveline, in particular a jointed driveline, that drives rotation of the cutter wheel 102 from the prime mover 106. The driveline is entirely mechanical in construction, rather than a hydraulic fluid drive, and consists of gearboxes, shafts, and joints in the illustrated embodiment. Modified forms of mechanical drivelines, some of which additionally include a belt drive for example, are provided in several additional embodiments following the description of the first embodiment. The prime mover 106, which is in some constructions an internal combustion engine having a crankshaft, is supported on the mainframe 104 behind the boom 108. Thus, the prime mover 106 does not move with the boom 108 during either of sweep or tilt. Although fixed to the mainframe 104, the prime mover 106 can be supported thereon by isolation mounts 138 (e.g., including resilient vibration absorbing material) such that there is an allowance for a limited range of relative movement. An output shaft 140 (FIG. 6A, e.g., the internal combustion engine crankshaft) of the prime mover 106 is oriented horizontally along an axis B. A clutch 142 couples the horizontal output shaft of the prime mover 106 with an input of the multi-gearbox transmission 134, in particular an input shaft 144 of a first right angle gearbox 146 (FIGS. 10B and 10C). The first right angle gearbox 146, and more particularly a housing thereof, is fixedly secured to the prime mover 106. As illustrated, the first right angle gearbox is mounted to the engine through the clutch 142, or more particularly a housing thereof. In the illustrated construction, the securement of the first right angle gearbox 146 is made by way of a plurality of removable fasteners through a mounting plate or flange 148, which may be separate from the gearbox 146 and the clutch 142 or integrated with at least one or the other. Thus, the first right angle gearbox 146 is fixed with the prime mover 106 and not movable with the tilt or sweep of the boom 108. By being supported from the prime mover 106, the first right angle gearbox 146 will have limited restrained movement relative to the mainframe 104 and sweep subframe 118, isolator-induced movements resulting from the prime mover 106 being mounted on isolation mounts 138, but is otherwise fixed or limited to a single operational position with respect to the mainframe 104. As such, and for brevity, the first right angle gearbox 146 is sometimes referred to herein as the fixed gearbox 146. However, the multi-gearbox transmission 134 further includes two additional right angle gearboxes 150, 152 forming a swivel gearbox assembly that is pivotally coupled to an output side of the fixed gearbox 146 in addition to accepting torque transmission therefrom. A driveline swivel shaft 170 (FIG. 10A) extends between the fixed gearbox 146 and the adjacent right angle gearbox 150 so as to form the output shaft of the gearbox 146 and the input shaft of the gearbox 150. The multi-gearbox transmission 134, and in fact the driveline as a whole to the cutter wheel 102, can be a fixed-ratio or single-speed power transmission.

The swivel gearbox assembly formed by the two additional right angle gearboxes 150, 152 can pivot relative to the fixed gearbox 146 about a first driveline swivel axis A, or "driveline sweep axis" along which the driveline swivel shaft 170 extends. In the illustrated construction, this is the same axis A about which the sweep subframe 118 pivots on the mainframe 104. In other words, the sweep axis for the boom 108 and the common axis shared between the fixed gearbox 146 and the swivel gearbox assembly 150, 152 are coincident and form the shared axis A. Although this is a mechanically advantageous arrangement, it is contemplated to alternately have an offset between these two axes. The swivel gearbox assembly 150, 152 is swivel-mounted onto the gearbox 146, neither gearbox 150, 152 having a direct connection to the mainframe 104 or the sweep subframe 118. However, the downstream right angle gearbox 152 has a partially-restrained connection with the tilt subframe 126 through the driveline alignment frame 132 as described further below. The gearbox 150 is coupled to the fixed gearbox 146 at a first gearbox-gearbox joint with an interstitial bearing 154, e.g., a slewing bearing configured for low speed back-and-forth oscillation. On the other hand, the two right angle gearboxes 150, 152 are pivotally coupled to each other at a second gearbox-gearbox joint with only internal bearings (e.g., two bearings in each gearbox housing, not shown) supporting a driveline tilt shaft 156 (integral shaft or connected shaft portions forming a common shaft) extending therebetween. The shaft 156 provides the output shaft of gearbox 150 and the input shaft of the gearbox 152. FIG. 10A illustrates the shaft 156 and how the housings of the gearboxes 150, 152 are thus spaced apart. However, it should be noted that the pivot or swivel connections between adjacent gearboxes of the multi-gearbox transmission 134 need not be made exactly in the manner illustrated. For example, the first and second gearbox-gearbox joints can each take the construction of the other, resulting in the joint types being reversed among the two joint locations or both joints having the same type of joint construction. According to the description of the illustrated embodiment and variations thereof, it will be appreciated that the gearboxes 150, 152 are pivotally mounted on the directly upstream gearboxes 146, 150, respectively, whether or not there is a separate bearing, and whether or not a coupling between the gearbox housings is provided.

Figure 7A:
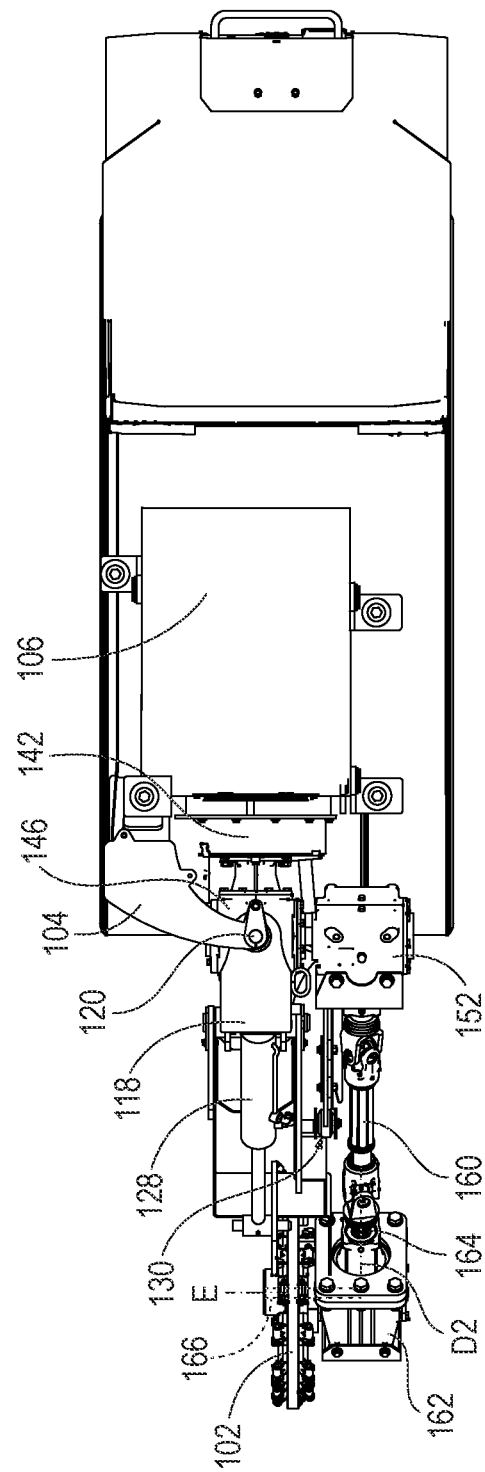
FIG. 7A is a plan view of the stump cutter with the boom in the downward position of FIGS. 5 and 6A.
Figure 7B:
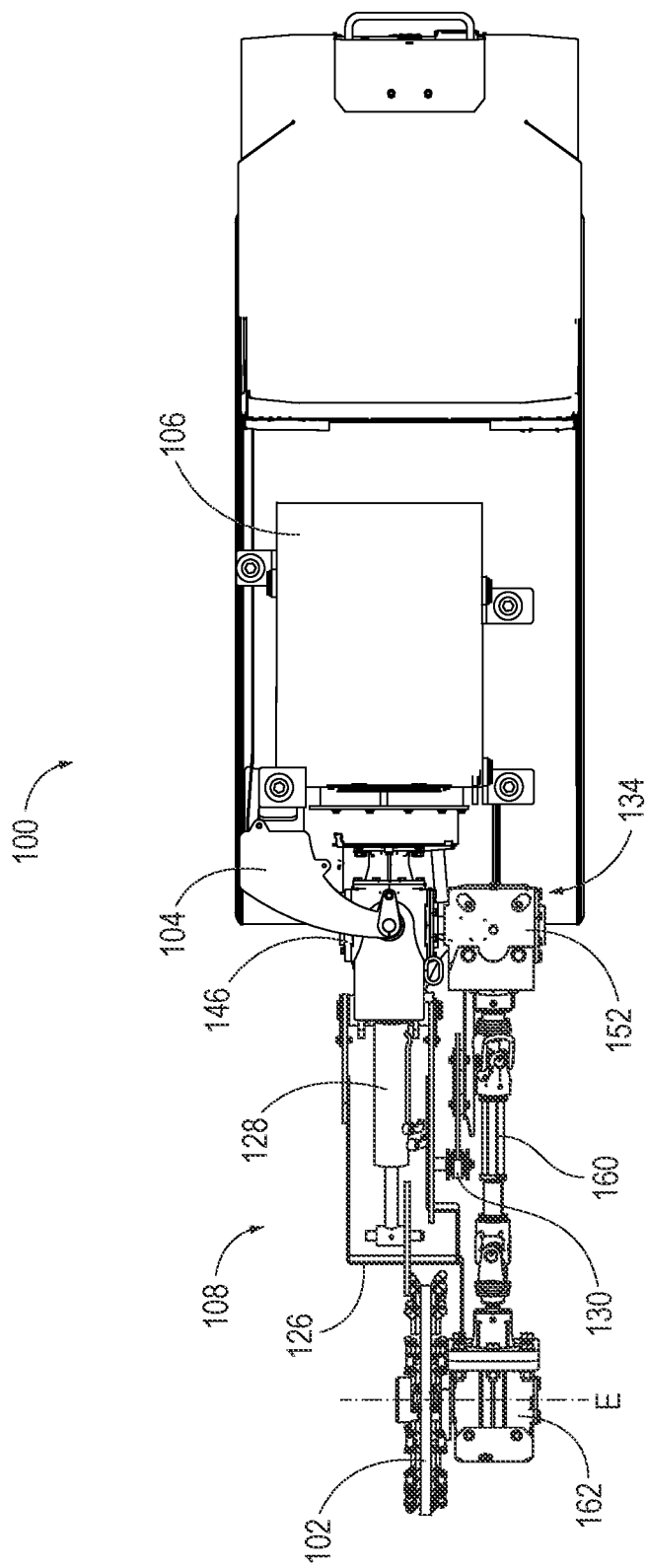
FIG. 7B is a plan view of the stump cutter with the boom raised to a neutral position.

As will be apparent from inspection of the drawings, boom sweep movements are accommodated in the drivetrain by pivoting of the gearboxes 150, 152 together relative to the fixed gearbox 146 about the first driveline swivel axis A, while boom tilt movements are accommodated in the drivetrain by pivoting the gearbox 152 relative to the gearbox 150 about a second driveline swivel axis C. The axes A, B remain orthogonal throughout operation by way of the construction of the fixed gearbox 146. The axes A, C remain orthogonal throughout operation by way of the construction of the intermediate gearbox 150. The axis C is movable within a plane offset from the axis B (e.g., movable within a horizontal plane below a horizontal plane containing the axis B). The final gearbox 152 of the multi-gearbox transmission 134 is provided with an output shaft 158 rotatable about an axis D1 as shown in FIGS. 10A to 10C. The axes C, D1 remain orthogonal throughout operation by way of the construction of the final gearbox 152. The multi-gearbox transmission 134 provides for the output axis D1 to assume a wide range of orientations with respect to the axes A, B. The output axis D1 generally follows a direction of elongation between proximal and distal ends of the boom tilt frame 126. The output shaft 158 is connected with an upstream end of a driveshaft assembly 160 that extends alongside the boom tilt subframe 126 to a final drive right angle gearbox or "cutter wheel gearbox 162" that has an input axis D2 and input shaft 164 arranged orthogonal from the cutter wheel axis E and output shaft 166 (FIG. 7A). The cutter wheel gearbox 162 is fixedly secured to the boom tilt subframe 126 at an end thereof opposite the pivot joint 124 on the sweep subframe 118. The driveshaft assembly 160 includes telescoping driveshaft portions and a U-joint 163 associated with each of these telescoping portions (FIGS. 6A, 8A, among others). This arrangement accommodates the different kinematic motion during tilting of the tilt subframe 126, about pivot 124, as compared to the tilt of the gearbox 152, which pivots about the axis C that is spaced rearward (nearer the prime mover 106).

Figure 5:
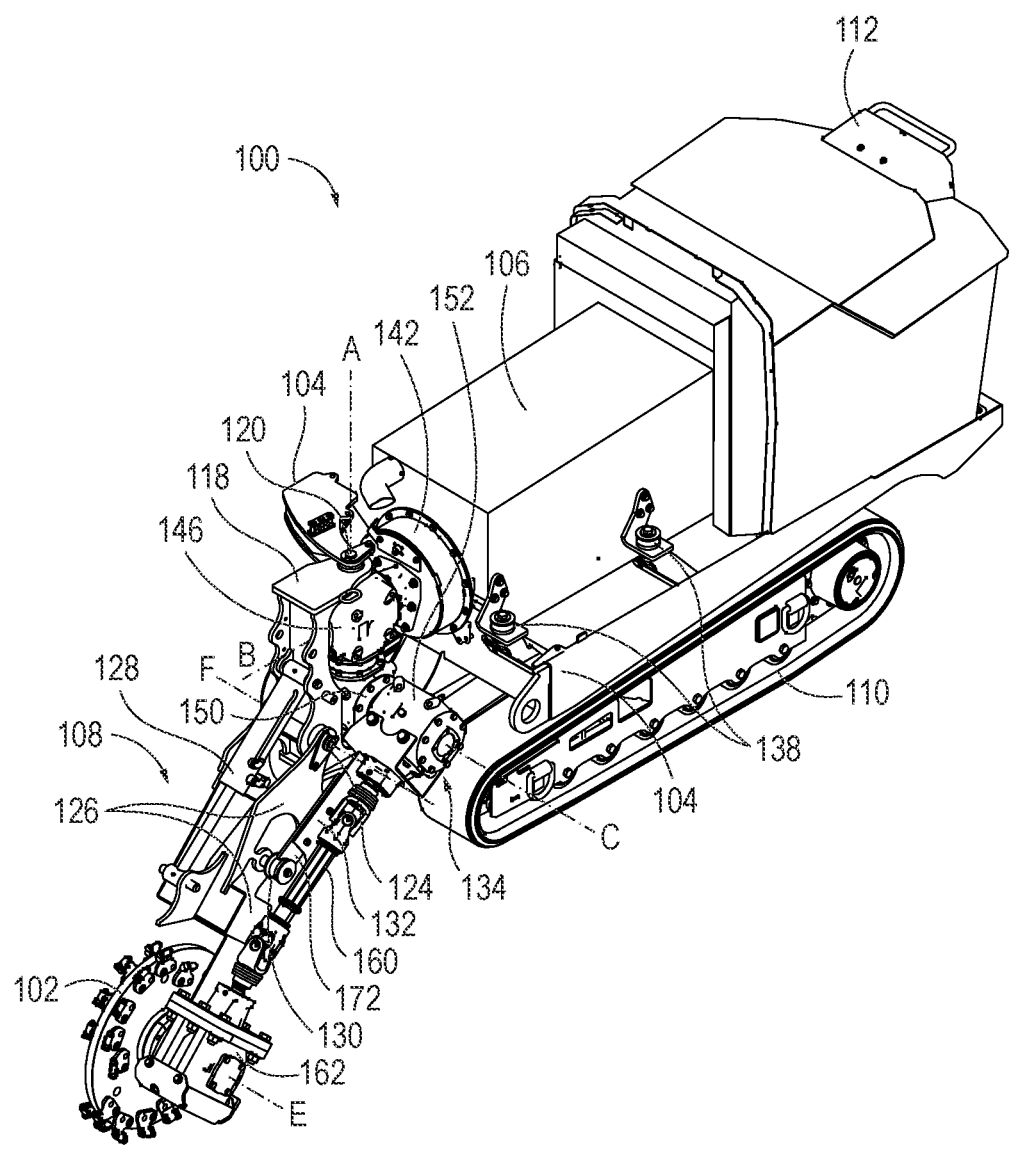
FIG. 5 is a perspective view similar to FIG. 4, although taken from the opposite side of the boom and showing the boom in a position that is tilted further downward.

Although the driveshaft assembly 160 is jointed so as to afford some flexibility in length and misalignment of the axes D1, D2 not present in a one-piece or otherwise "fixed" driveshaft, the axial misalignment in particular should be limited and further, angles in the two U-joints 163 should be equalized to the extent possible. Control of the structure of the driveshaft assembly 160 in this way enables sinusoidal speed variation in one U-joint 163 to be offset or canceled by that of the other U-joint 163 to obtain the overall effect of maintaining constant velocity imparted to the cutter wheel 102 through each rotation. As can be appreciated by those of skill in the art, the driveshaft assembly 160 provides constant velocity power transmission without necessitating the inclusion of a constant velocity (CV) joint, per se, i.e., a single joint that, by its intrinsic structure, ensures constant velocity when the input/output are articulated. In order to provide mechanical structure to the flexible driveshaft assembly 160, the stump cutter 100 includes a gearbox alignment structure or driveline alignment structure consisting in part of a portion of the tilt subframe 126 (which is fixed to the cutter wheel gearbox 162) and the driveline alignment frame 132 (which forms a torque arm fixed to the third right angle gearbox 152). As best shown in FIGS. 5, 8B and 8C, the gearbox alignment structure extends along the driveshaft assembly 160 and includes a plurality of joints, including the aforementioned pivot joint 130. The pivot joint 130 is formed between the tilt subframe 126 and an intermediate arm 172. The intermediate arm 172 forms another joint, in particular a sliding joint 174, with the driveline alignment frame 132 on the third right angle gearbox 152. In other constructions, the configuration of the two joints 130, 174 along the intermediate arm 172 can be reversed. The sliding joint 174 provides a single translational degree of freedom between the intermediate arm 172 and the driveline alignment frame 132 (and with it, the third gearbox 152). The pivot joint 130 provides a limited range of motion about a joint axis extending perpendicular to the axis formed by the translational degree of freedom, which in the illustrated construction is parallel to and offset from the axis D1 of the output shaft 158 of the third gearbox 152. The gearbox alignment structure maintains the axis D1 in a defined vertical plane 176 (FIG. 8C with the axis D2 of the input shaft of the cutter wheel gearbox 162) as the gearbox 152 pivots about its axis C. The vertical plane 176 is fixed with respect to the tilt subframe 126, and thus the plane 176 sweeps with the boom relative to the mainframe 104. Accordingly, the potential misalignment between the axes D1, D2 is limited. The driveline alignment frame 132 also controls the rotational position of the two gearboxes 150, 152 about the axis A during sweep.

The jointed driveline provided by the above structures, including the multi-gearbox transmission 134, the driveshaft assembly 160, and the cutter wheel gearbox 162 provides a compact and highly efficient manner of power transmission while equipping the boom 108 with wide ranges of sweep and tilt. Aside from the clutch 142, which resides immediately downstream of the prime mover 106, the entire driveline is comprised of positive, non-slipping transmission elements that establish permanent or continuous mechanical engagement. In other words, aside from disassembly, the power transmission path remains intact at all times and is not configured for selective disengagement. In some constructions, there is no clutch between the prime mover 106 and the driveline. With or without a clutch, inefficiencies of power conversion (e.g., mechanical to fluid pressure and back to mechanical) are largely or wholly avoided. Along the boom 108 with its numerous structural and driveline pivots, minimal or no electric harnesses and/or hydraulic hoses need pass through a pivot between the prime mover 106 and the cutter wheel 102. The illustrated driveline also allows the prime mover 106 to remain in a fixed orientation on the mainframe 104 so that a conventional and economical internal combustion engine may reliably be utilized, as the engine's operating orientation is independent of the boom's articulation. The construction as illustrated also helps minimize boom length for the stump cutter 100. Boom length is determined by the sweep angle, the total angle the boom 108 can sweep through in order to achieve a predetermined sweep distance. With a smaller allowable sweep angle, the boom needs to be longer to achieve the predetermined sweep distance. In the illustrated construction, the allowable sweep angle has no angular limitation resulting from the driveline. Reduced boom length has the advantage of better stability, boom control, and footprint.

Figure 11:
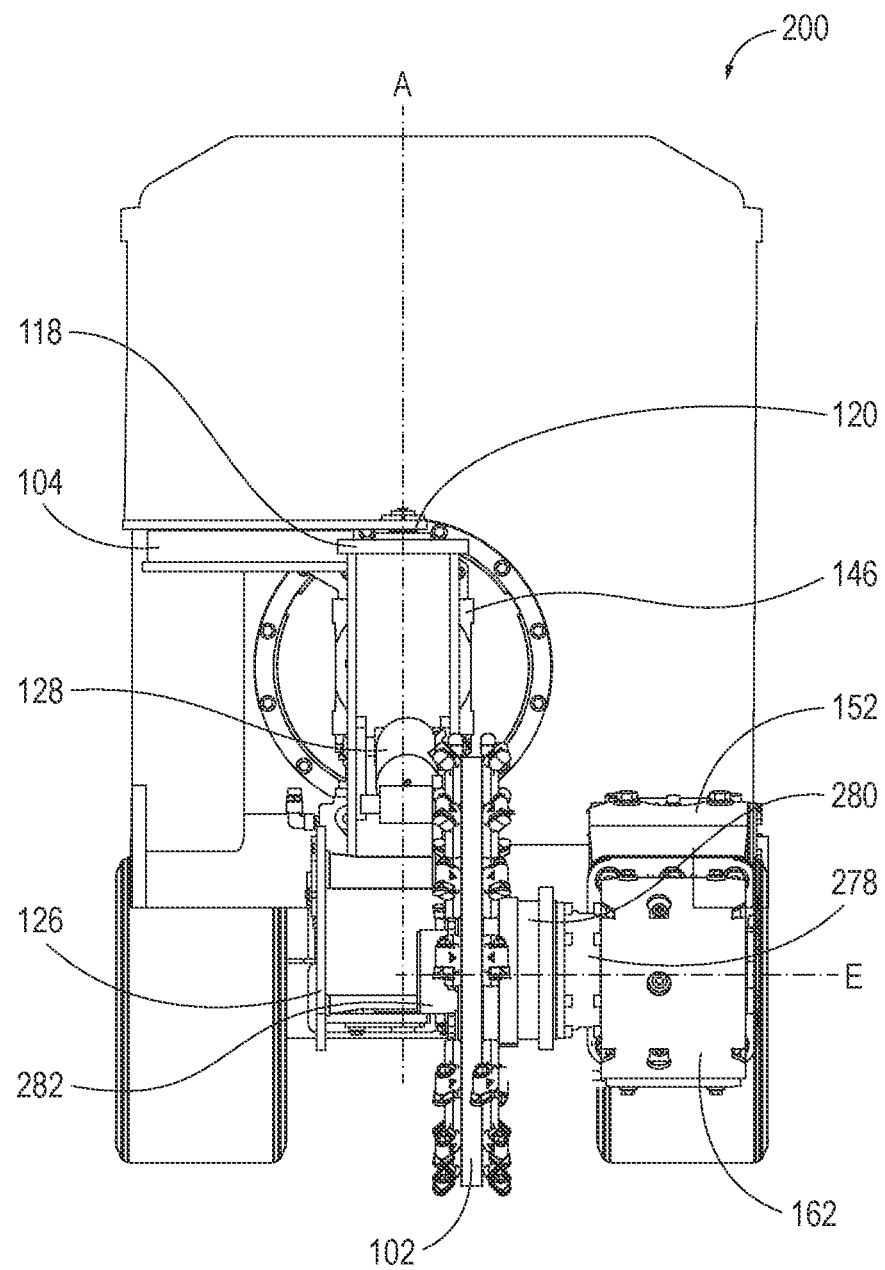
FIG. 11 is a front elevation view of a stump cutter according to a second embodiment of the present disclosure.
Figure 12A:
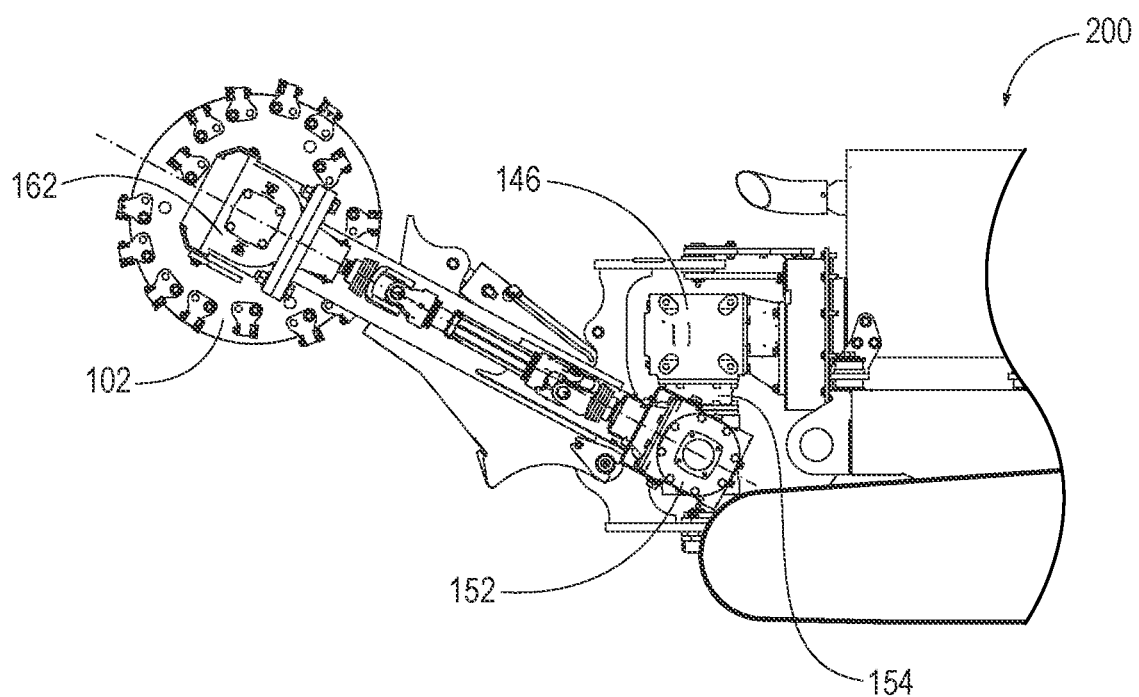
FIGS. 12A to 12C are right side elevation views showing the stump cutter of FIG. 11 in raised, neutral, and lowered boom positions, respectively.
Figure 12B:
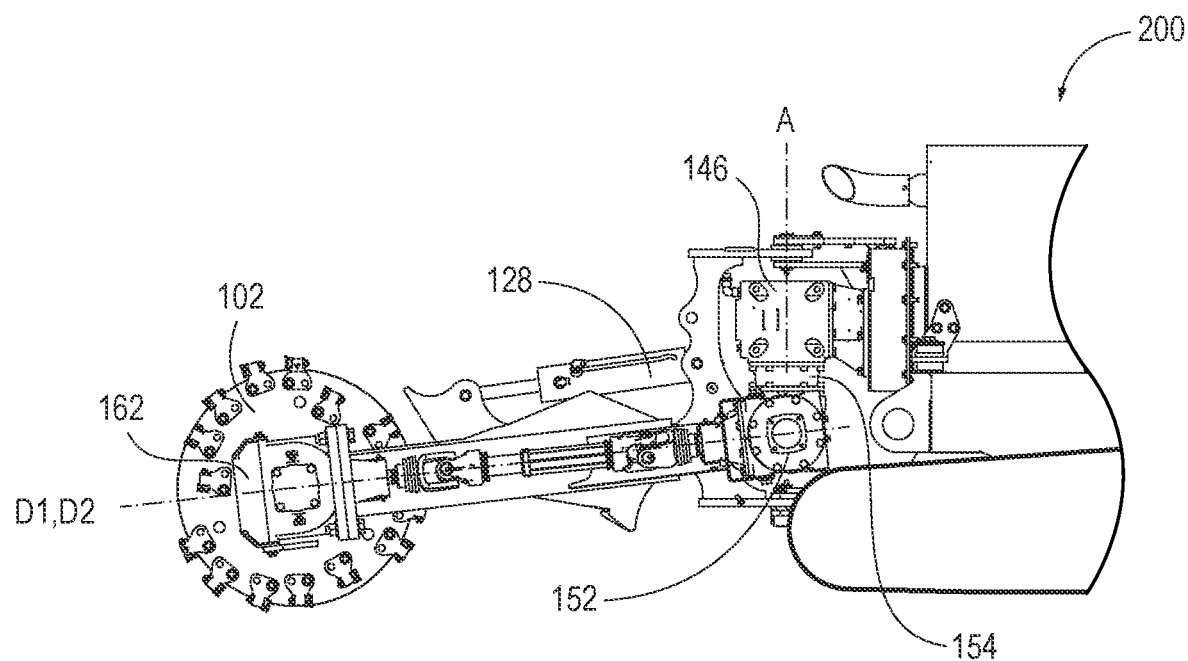
Figure 12C:
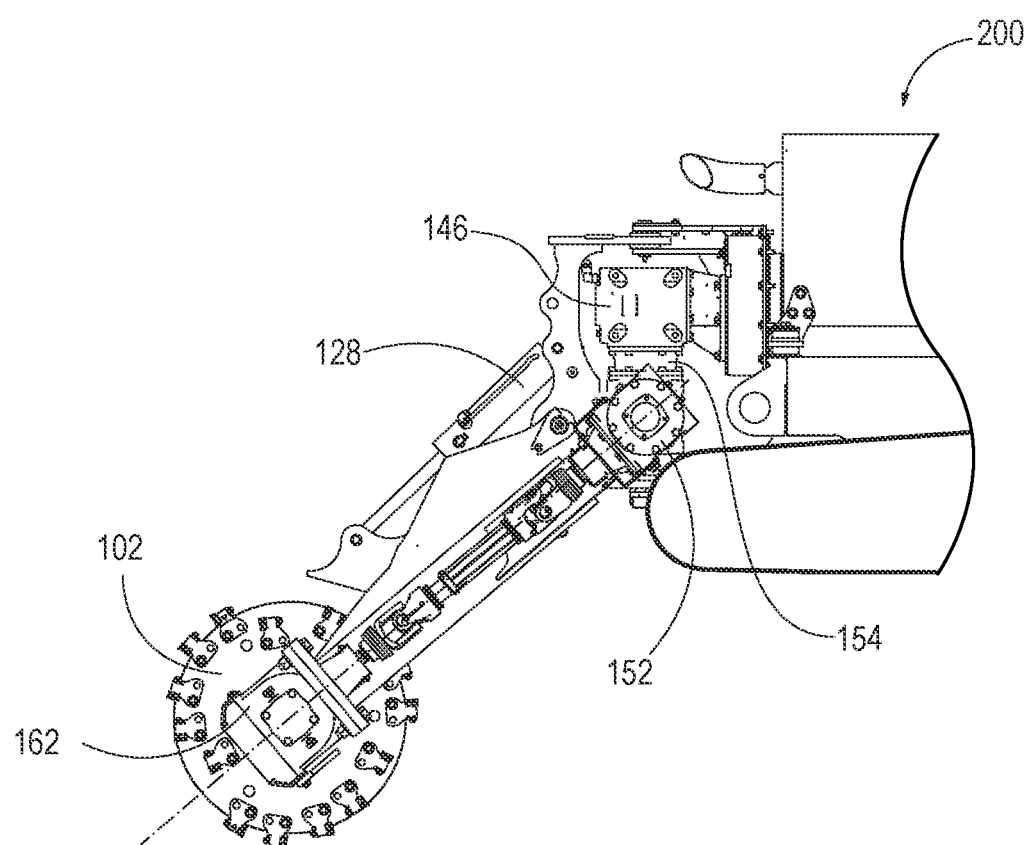
Figure 13:
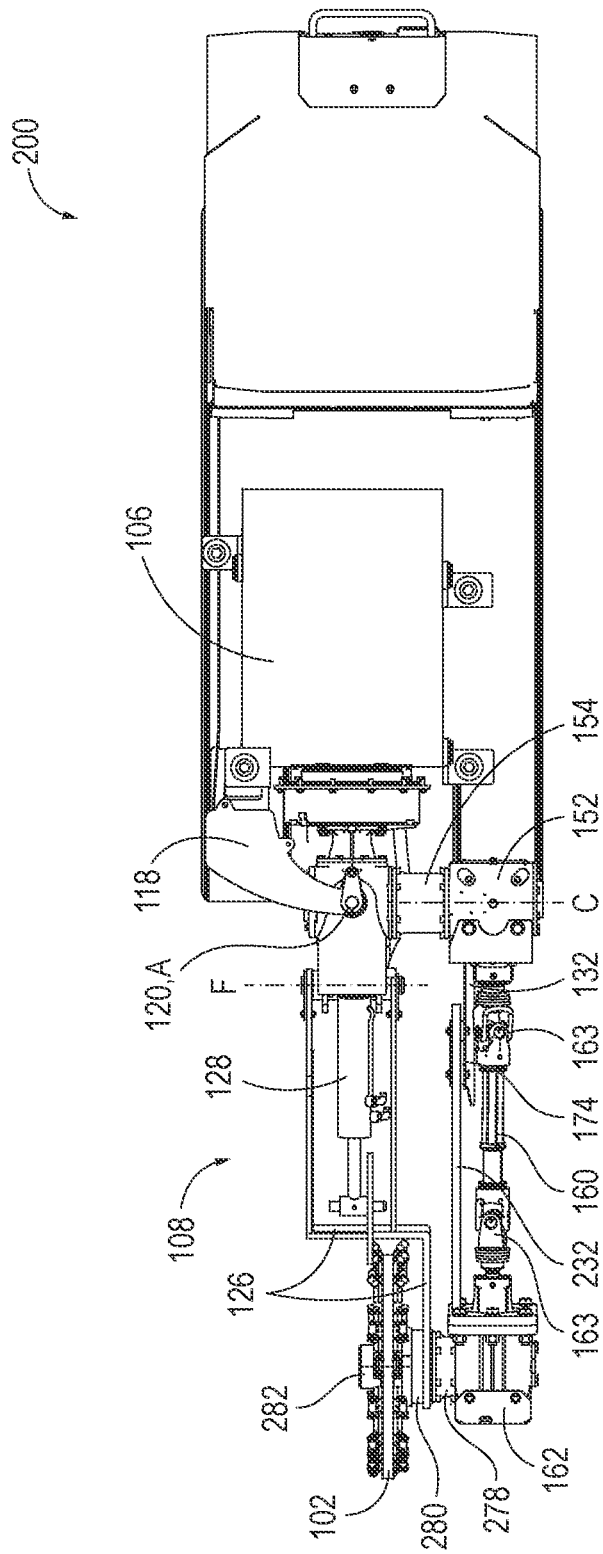
FIG. 13 is a plan view of the stump cutter of the second embodiment.
Figure 14:
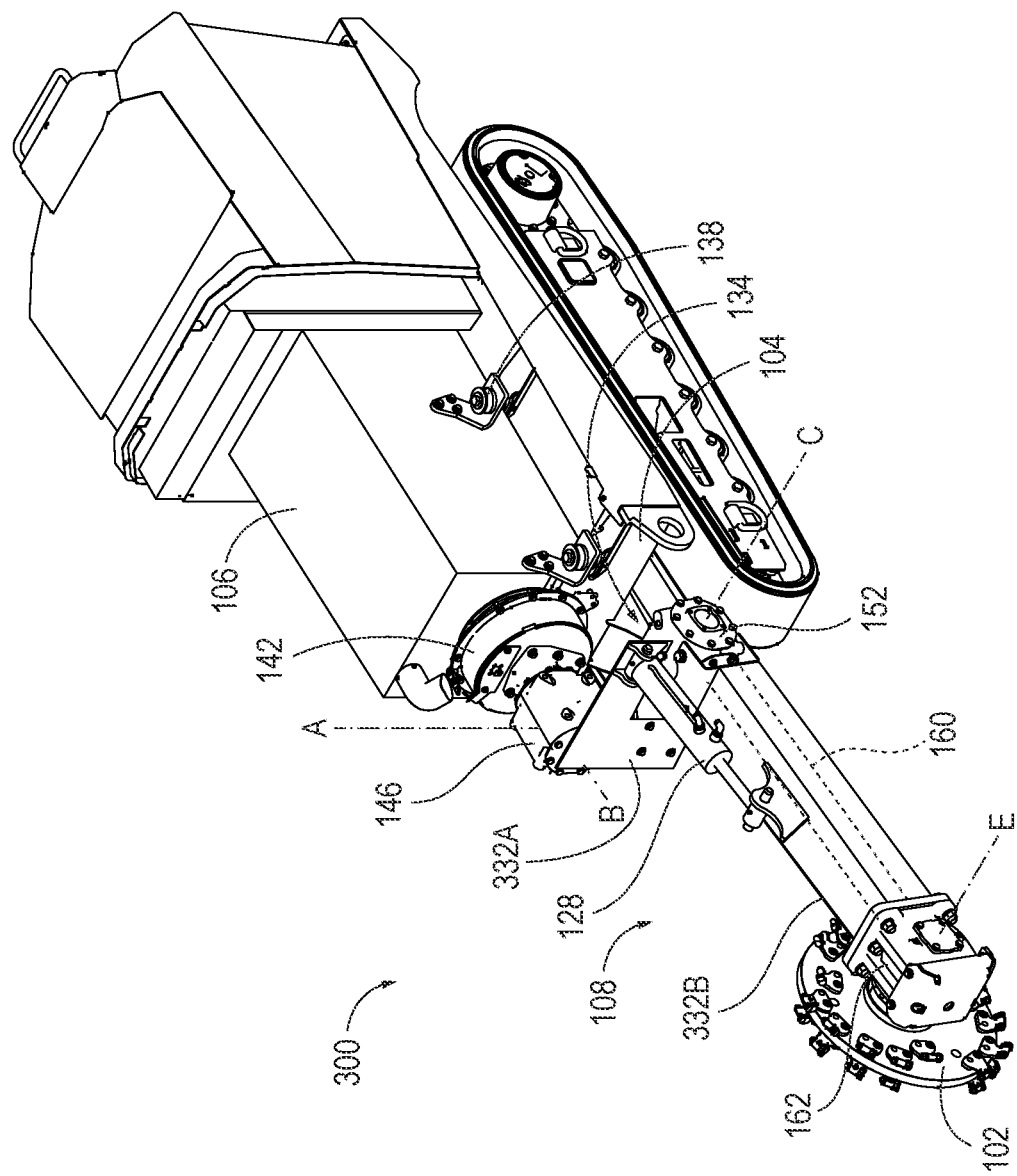
FIG. 14 is a perspective view of a stump cutter according to a third embodiment of the present disclosure.

FIGS. 11 to 13 illustrate a stump cutter 200 of a second embodiment in which the final drive cutter wheel gearbox 162 is not fixedly secured at the distal end of the tilt subframe 126, but rather is pivotally mounted to allow rotation of the cutter wheel gearbox 162. Except for this distinction, which is further described below along with related supporting modifications, the stump cutter 200 conforms to the above description of the stump cutter 100 and includes the features thereof, with like reference numbers as applicable. In order to provide the capability for the cutter wheel gearbox 162 to swivel or pivot on the tilt subframe 126, an extra bearing 278 is provided. The bearing 278, for example a slewing bearing, can be provided between the cutter wheel gearbox 162 and the tilt subframe 126, either as an interstitial component or integrated with the structure on one side or the other. The bearing 278 is separate from high speed bearings needed to support rotation of the cutter wheel 102 (and the output shaft of the cutter wheel gearbox 162). For example, the cutter wheel gearbox 162 can include one or more bearings internal to its housing, and at least one bearing 280 is provided to support a hub 282 of the cutter wheel 102 on the tilt subframe 126. Because the cutter wheel gearbox 162 of FIGS. 11 to 13 is not strictly fixed to the orientation of the tilt subframe 126, the pivot joint 130 of the prior embodiment is disposed of, and the gearbox alignment structure consists of only the sliding joint 174 between the driveline alignment frame 132 fixed on the housing of the third gearbox 152 and a similar second alignment frame 232 (e.g., torque arm fixed to the housing of the cutter wheel gearbox 162) extending from the cutter wheel gearbox 162 toward the first driveline alignment frame 132. Thus, the gearbox alignment structure telescopes only, and does not articulate. Although the U-joints 163 are illustrated as part of the driveshaft assembly 160, and may be included for manufacturing and assembly convenience, the driveshaft assembly 160 only telescopes and does not articulate during movement of the boom 108. The axes D1, D2 (out of the third gearbox 152 and into the cutter wheel gearbox 162) remain in alignment throughout operation of the boom 108, from the point of manufacture. It is also noted that FIG. 13 illustrates another interstitial bearing 154 provided between the second and third gearboxes 150, 152 of the pivotally mounted swivel gearbox assembly, a feature that was noted as optional in the preceding description, as it is in the stump cutter 200. In other words, the additional structural connection provided by the bearing 154 can be eliminated, provided that the shaft and internal gearbox bearings provide adequate strength.

Figure 15:
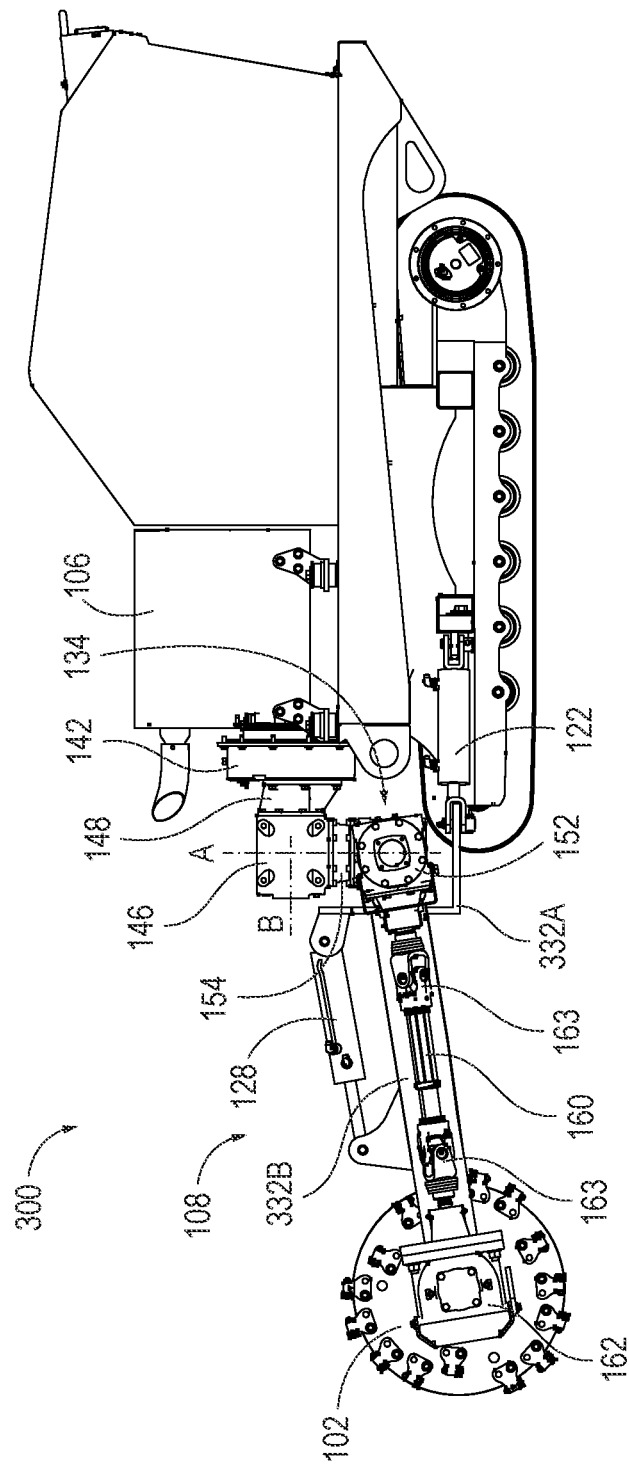
FIG. 15 is a side elevation view of the stump cutter of FIG. 14, including a partial cutaway to illustrate the sweep cylinder.
Figure 16:
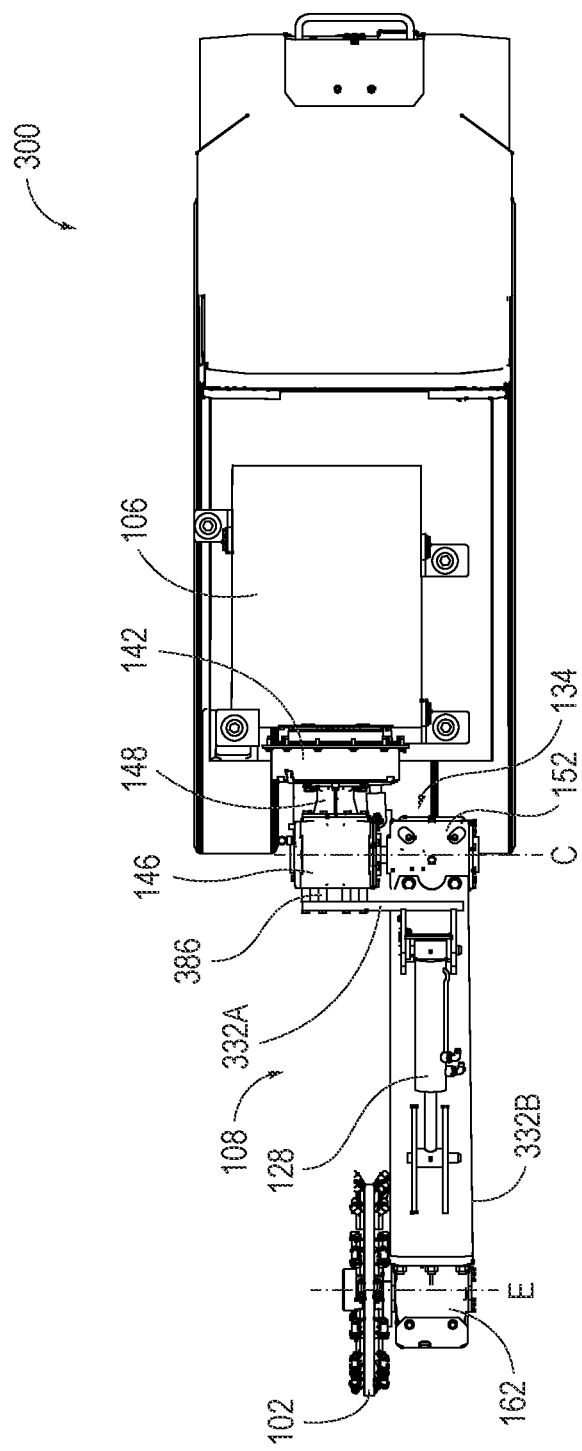
FIG. 16 is a plan view of the stump cutter of FIGS. 14 to 15.
Figure 17:
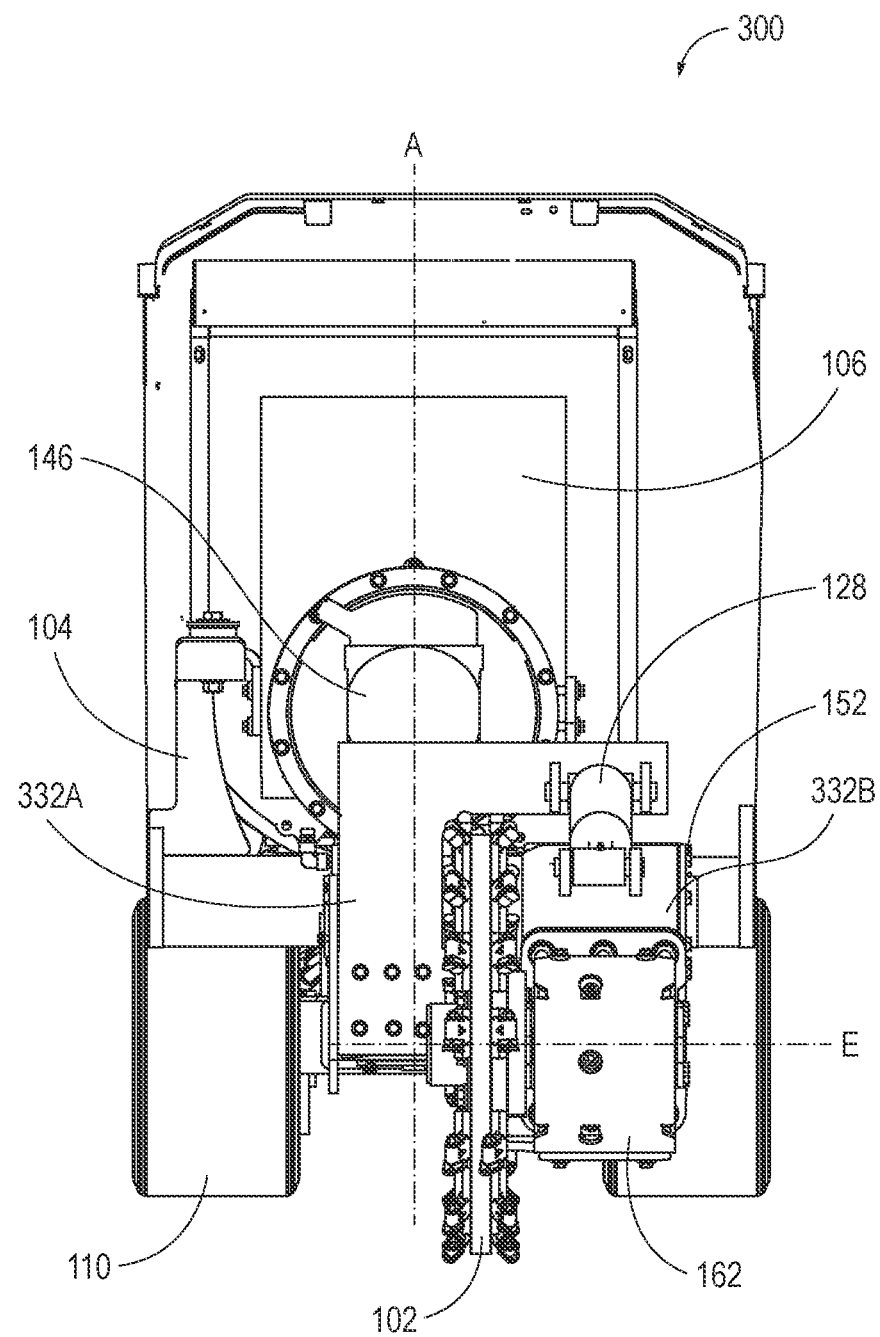
FIG. 17 is a front elevation view of a stump cutter of FIGS. 14 to 16

FIGS. 14 to 17 illustrate a stump cutter 300 of a third embodiment in which the gearboxes 146, 150, 152, 162 are stressed frame elements for the boom 108, and the individual subframes 118, 126 and pivots 120, 124 are eliminated. Except for this distinction, which is further described below along with related supporting modifications, the stump cutter 300 conforms to the above description of the stump cutter 100 and includes the features thereof, with like reference numbers as applicable. Elimination of the sweep and tilt subframes 118, 126 eliminates a load path for conveying boom loads to the mainframe 104. Rather, the boom 108 of the stump cutter 300 transmits boom loads to the mainframe 104 through the stressed elements of the driveline. In other words, the entire boom 108 is cantilevered from the prime mover 106 and the fixed right angle gearbox 146. The only joint supporting boom sweeping about the axis A is the driveline swivel shaft 170 (and coaxial bearing(s), e.g., the interstitial bearing 154) between the fixed gearbox 146 and the adjacent right angle gearbox 150 of the pivot-mounted swivel gearbox assembly (FIG. 10A). Likewise, the only joint supporting boom tilting (which pivots about the axis C rather than the offset tilt axis F) is the driveline tilt shaft 156 (and coaxial bearing(s), e.g., internal to the gearboxes 150, 152) between the pair of horizontally-adjacent right angle gearboxes 150, 152 of the pivot-mounted swivel gearbox assembly (FIG. 10A). The sweep cylinder 122 is connected between the mainframe 104 and a first driveline alignment frame 332A that is fixedly secured to the gearbox 150 that serves as the middle gearbox of the three-gearbox transmission. The first driveline alignment frame 332A can be mounted to the housing of the gearbox 150 with spacers 386 (e.g., arranged along each of a plurality of threaded fasteners) to provide adequate clearance for the first driveline alignment frame 332A to clear the fixed gearbox 146 during sweep. As shown in FIG. 15, the tilt cylinder 128 is mounted to the first driveline alignment frame 332A adjacent an upper end thereof. The second or distal end of the tilt cylinder 128 is mounted to the second driveline alignment frame 332B that extends between and fixedly secures the gearboxes 152, 162 together so that the axes D1, D2 are effectively a single axis, although the driveshaft assembly 160 can still include the U-joints 163 for ease of initial assembly. The driveshaft assembly 160 need not be provided as a telescoping structure, as it will not change length during boom movements. The driveshaft assembly 160 can be partially or fully enclosed by the second driveline alignment frame 332B, which is partially cut away in FIG. 15 for illustration of the driveshaft assembly 160. The two driveline alignment frames 332A, 332B are only indirectly connected to each other through the pivotally-connected gearboxes 150, 152 of the multi-gearbox transmission 134.

Figure 18:
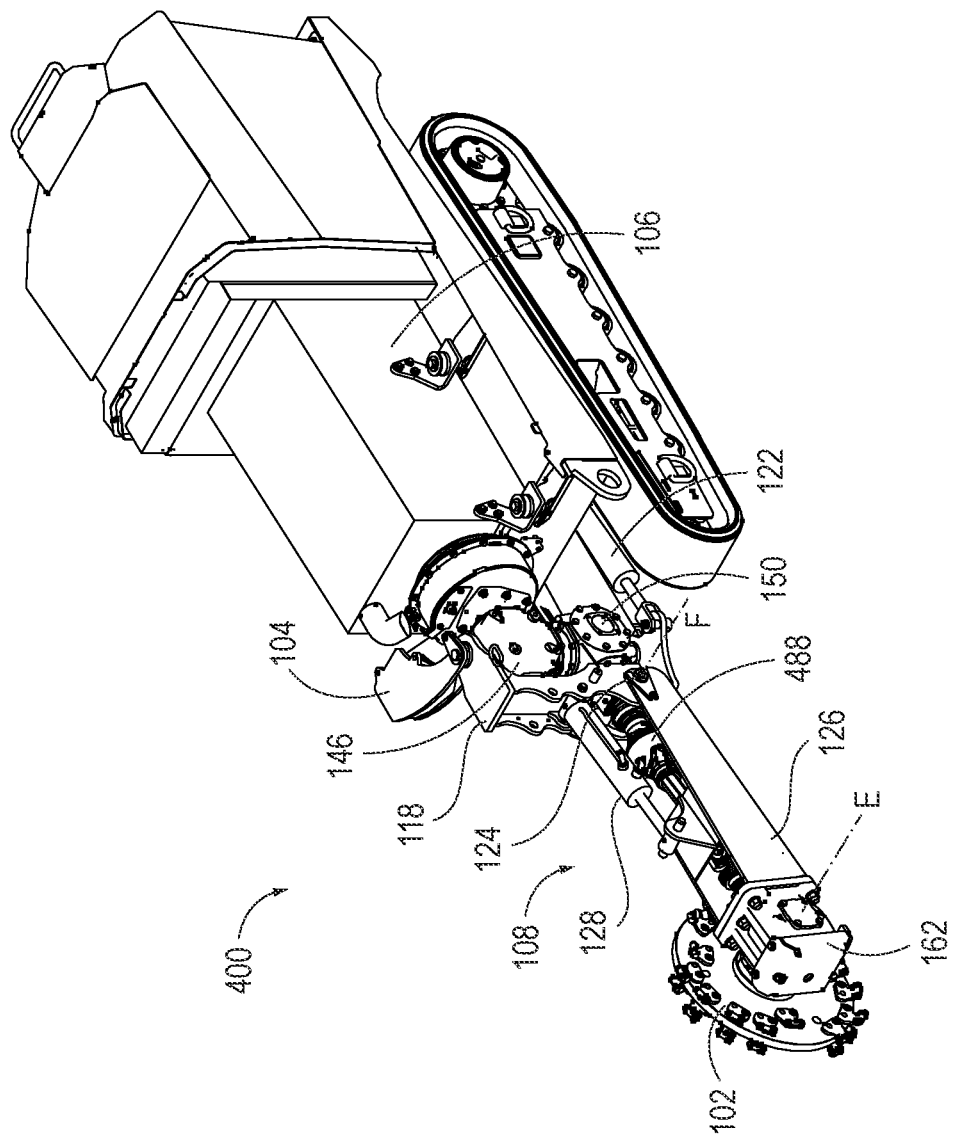
FIG. 18 is perspective view of a stump cutter according to a fourth embodiment of the present disclosure.
Figure 19:
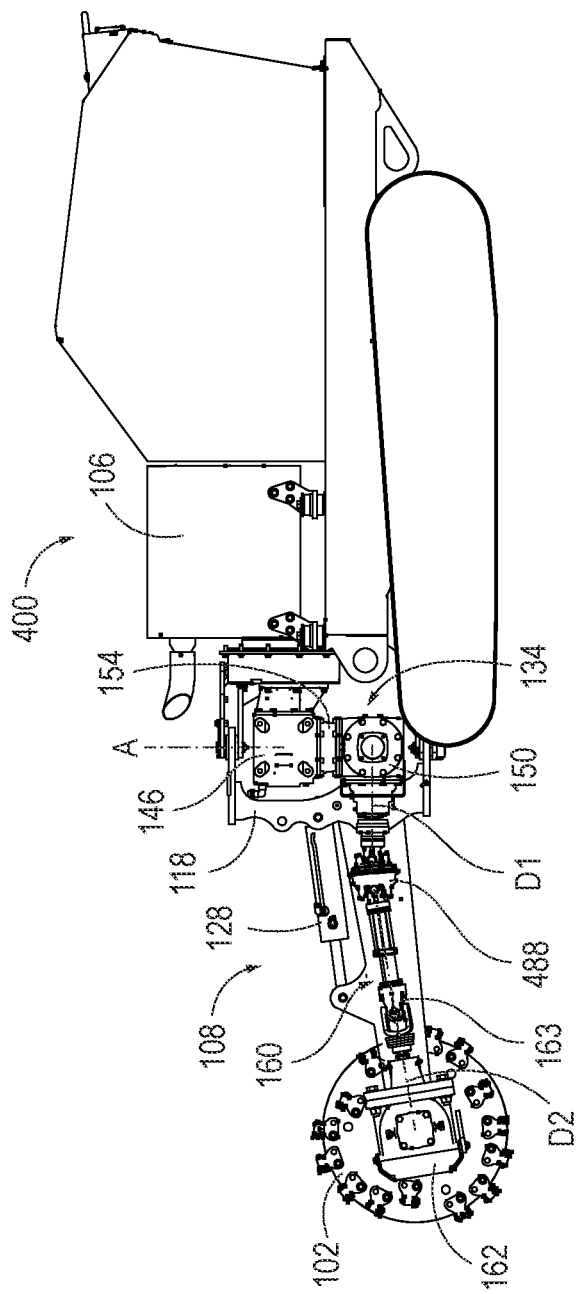
FIG. 19 is a side elevation view of the stump cutter of FIG. 18.
Figure 20:
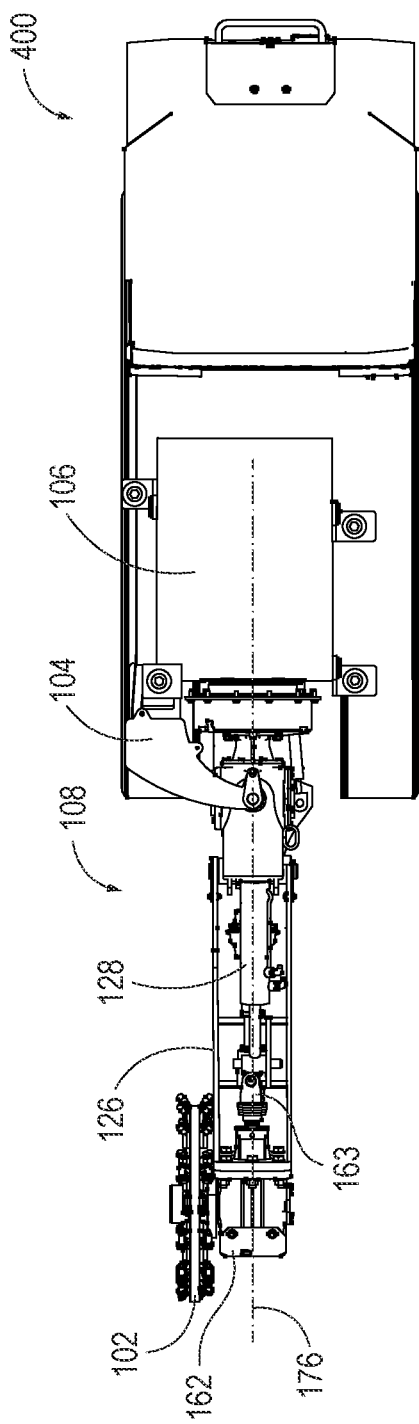
FIG. 20 is a plan view of the stump cutter of FIGS. 18 and 19.

FIGS. 18 to 20 illustrate a stump cutter 400 of a fourth embodiment in which the gearbox 152 is eliminated, with boom tilt instead being accommodated by a CV joint 488. Except for this distinction, which is further described below along with related supporting modifications, the stump cutter 400 conforms to the above description of the stump cutter 100 and includes the features thereof, with like reference numbers as applicable. Rather than the gearbox 150 having the output shaft extend laterally into the gearbox 152, the output shaft 156 from the gearbox 150 extends directly to the driveshaft assembly 160 (refer back to FIG. 10A for the output shaft 156, disregarding the gearbox 152). Thus, the axis D1 is defined by the output of the gearbox 150, and the vertical plane 176 containing the driveshaft axes D1, D2 also contains the axis A, which is the sweep axis of both the driveline and the cutter wheel 102. All three gearboxes 146, 150, 162 are arranged along the vertical plane 176. Virtually all of the misalignment between the axes D1, D2 is accommodated within the CV joint 488 (i.e., all of the operational or post-manufacture misalignment). However, a U-joint may still be included for ease of initial assembly. Although not apparent from the drawings, the gearbox 150 between the gearboxes 146, 162 can be fixedly secured to the sweep subframe 118. The tilt subframe 126, a portion of which is removed in FIG. 19 to show the driveline in its entirety, partially surrounds the driveshaft assembly 160 including the CV joint 488 (e.g., portions of the tilt subframe 126 flank both lateral sides of the driveshaft assembly 160).

Figure 21:
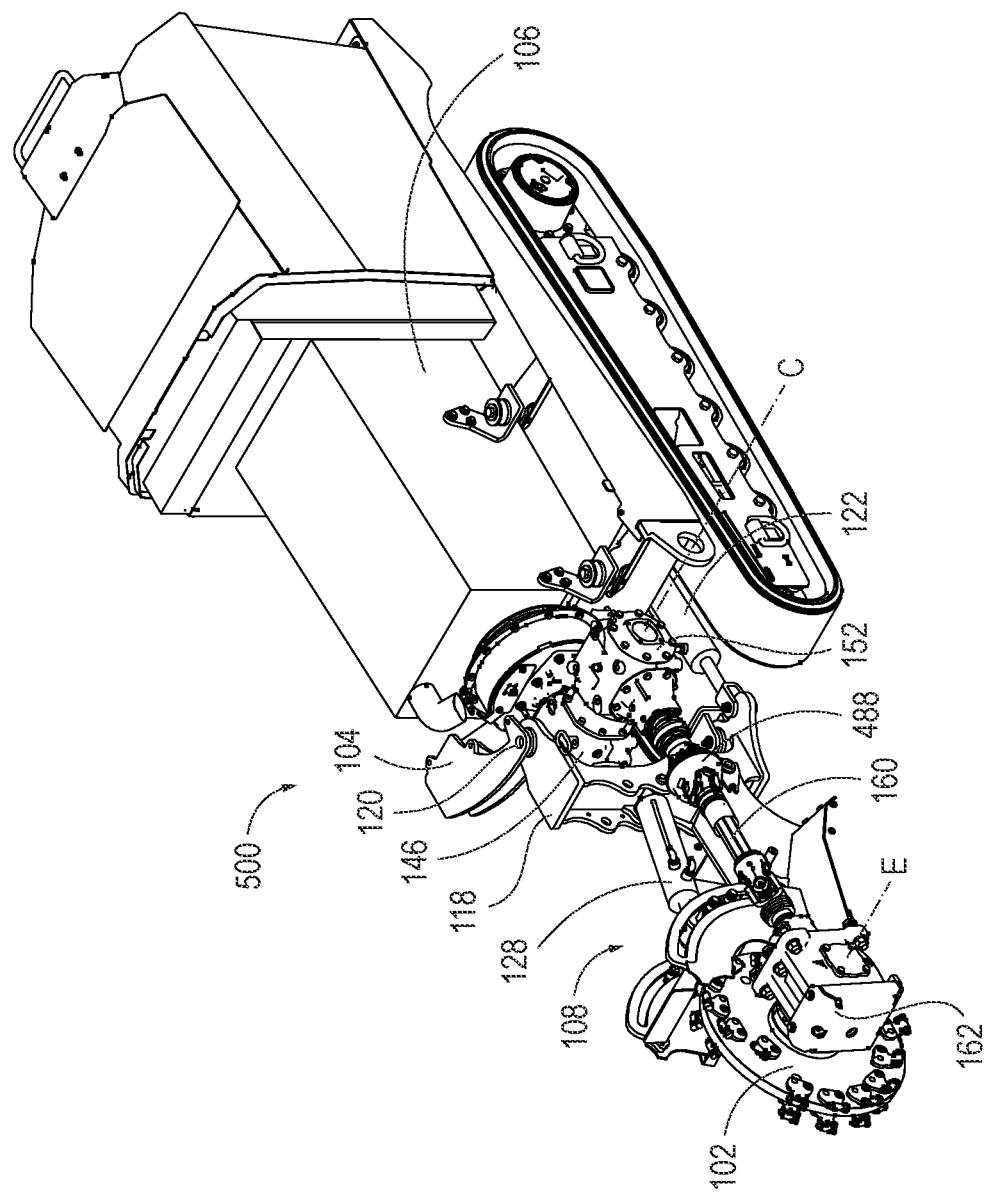
FIG. 21 is a perspective view of a stump cutter according to a fifth embodiment of the present disclosure.
Figure 22:
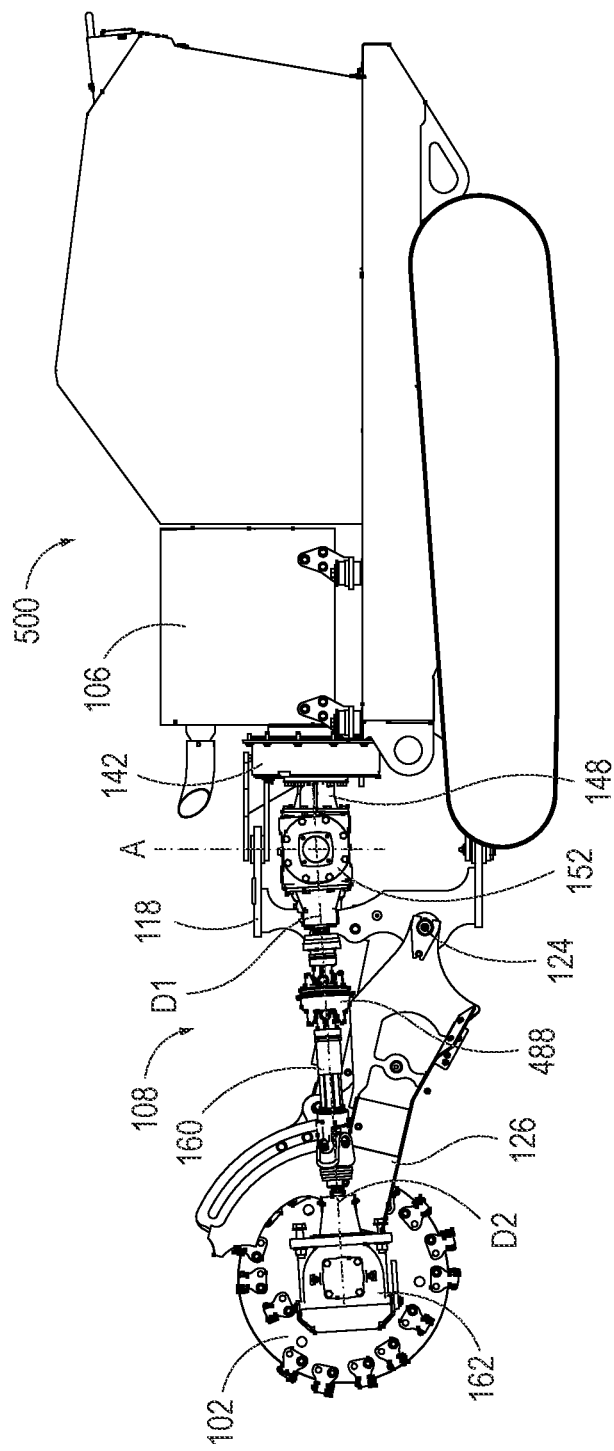
FIG. 22 is a side elevation view of the stump cutter of FIG. 21.

FIGS. 21 and 22 illustrate a stump cutter 500 of a fifth embodiment in which, like the stump cutter 400, the CV joint 488 is provided so that one of the gearboxes of the first embodiment can be eliminated. In the case of the stump cutter 500, the second gearbox 150 is eliminated, with boom sweep instead being accommodated by the CV joint 488. As such, the gearbox 152 that extends to the driveshaft assembly 160 is swivel-mounted to the fixed gearbox 146. The fixed gearbox 146 is oriented so that the output shaft thereof extends horizontally rather than vertically. The output shaft of the fixed gearbox 146, which may also form the input shaft of the gearbox 152, does not form the driveline sweep axis, but rather the driveline tilt axis C. Because the orientation of the output shaft of the gearbox 152 is free to swivel and will follow the tilting orientation of the input shaft of the final drive cutter wheel gearbox 162, the cutter wheel gearbox 162 can be fixedly secured to the end of the tilt subframe 126, but may alternately be swivel-mounted as in the second embodiment due to the presence of the CV joint 488. The boom 108 must be designed with proper clearance for sweep movement between the sweep subframe 118 and the gearbox 152, which does not move during sweep. Although removed from the drawings for clarity in illustrating the driveline, the stump cutter 500 also includes a driveline alignment frame between the gearbox 152 and the cutter wheel gearbox 162. The driveline alignment frame is of a telescoping structure by way of a sliding joint.

Figure 23:
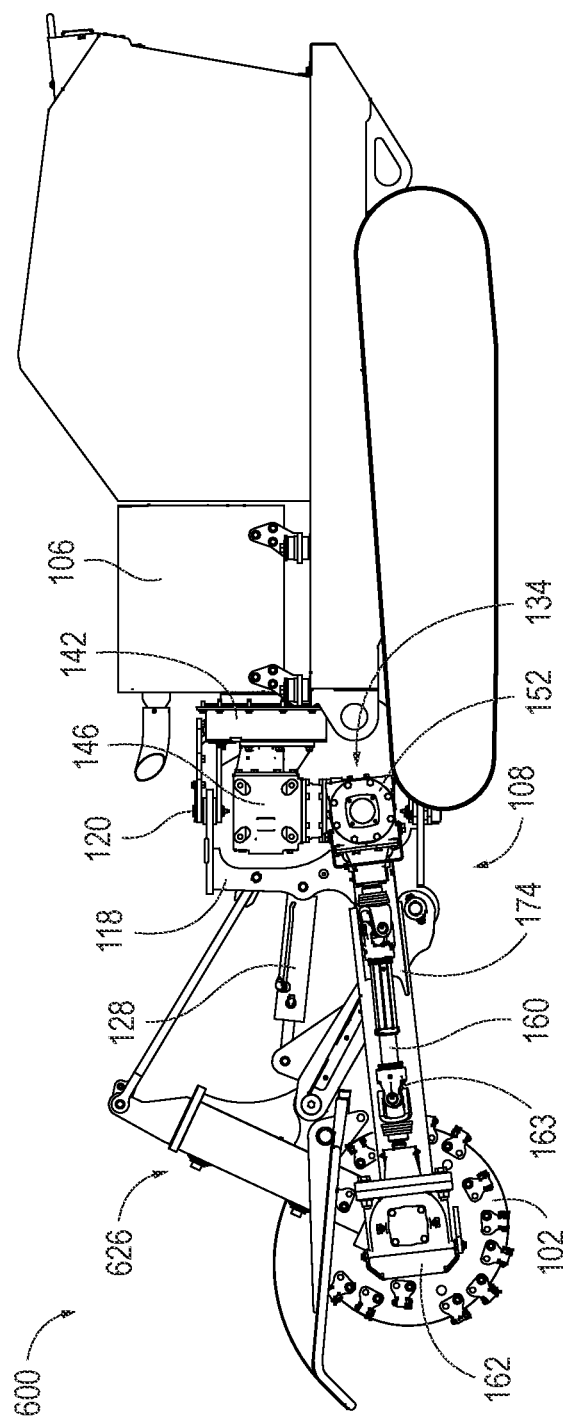
FIG. 23 is a side elevation view of a stump cutter according to a sixth embodiment of the present disclosure.

FIG. 23 illustrates a stump cutter 600 of a sixth embodiment in which the tilt subframe is replaced by a four-bar linkage lift system 626. Except for this distinction, which is further described below along with related supporting modifications, the stump cutter 600 conforms to the above description of the stump cutter 100 and includes the features thereof, with like reference numbers as applicable. More particularly, the stump cutter 600 can be considered a modified version of the stump cutter 200 of the second embodiment. The stump cutter 600 includes a pivoting final drive cutter wheel gearbox 162, and the driveline alignment structure includes only the sliding joint 174, which is largely obscured in the side elevation view of FIG. 23. In some constructions, the four-bar linkage lift system 626 can conform to that of commonly-owned U.S. Pat. No. 8,783, 308 (or aspects thereof), the entire contents of which are incorporated by reference herein. Due to the four-bar arrangement, there is not a finite tilt axis at a fixed point on the sweep subframe 118. Rather than the cutter wheel 102 following a circular path in side elevation view, the cutter wheel 102 tilt motion follows a path defined by the links and pivots of the four-bar linkage when actuated by the tilt cylinder 128. The tilt path can have a variable radius that is significantly larger (flatter path) in one portion of its travel.

The use of the four-bar linkage lift system 626 is not limited to the details of this embodiment, and may be employed with various other embodiments of the present disclosure, including those with a non-pivotally-mounted final drive cutter wheel gearbox 162 or those where one of the gearboxes 150, 152 is eliminated.

Figure 24:
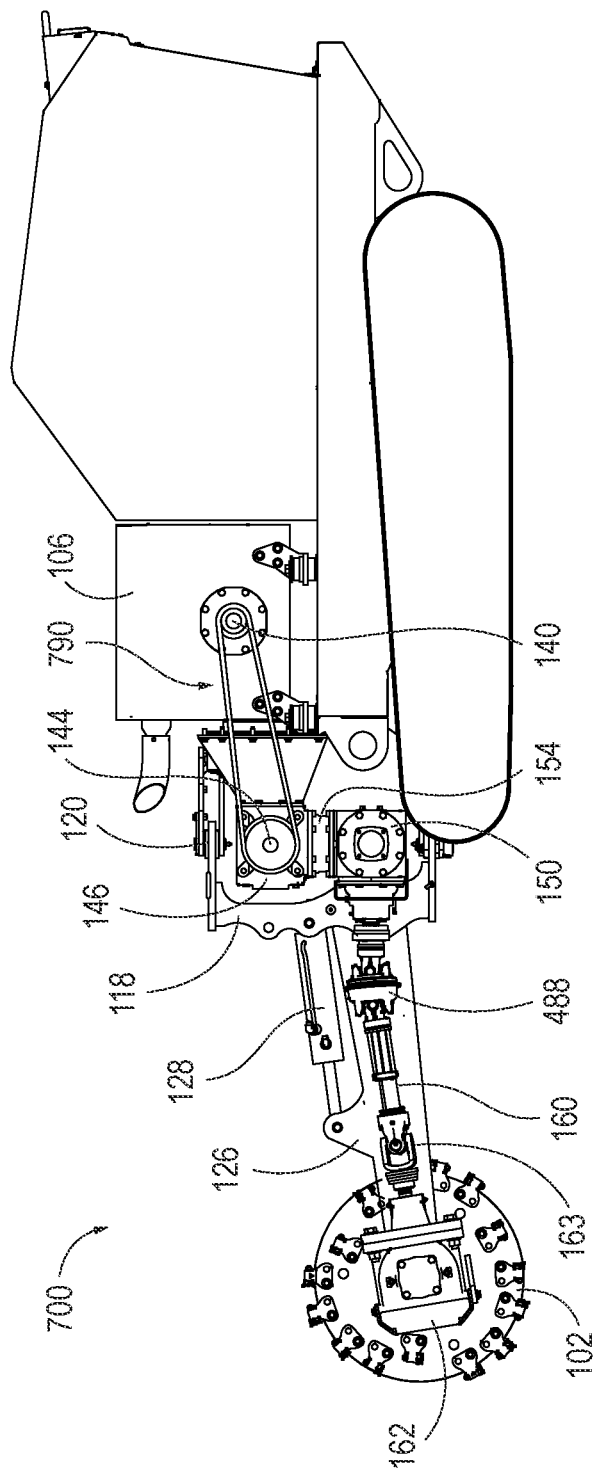
FIG. 24 is a side elevation view of a stump cutter according to a seventh embodiment of the present disclosure.

FIG. 24 illustrates a stump cutter 700 of a seventh embodiment in which the fixed gearbox 146 has a belt connection or belt drive 790 from the prime mover 106 rather than a shaft connection as in the earlier embodiments. Except for this distinction, which is further described below along with related supporting modifications, the stump cutter 700 conforms to the above description of the stump cutter 100 and includes the features thereof, with like reference numbers as applicable. More particularly, the stump cutter 700 is a modified version of the stump cutter 400 of the fourth embodiment in which the gearbox 152 is eliminated, with boom tilt instead being accommodated by the CV joint 488. However, the belt drive 790 can be applied to other embodiments of the present disclosure as well. The belt drive 790 is implemented by reorienting (with respect to the first embodiment) the input shaft 144 of the fixed gearbox 146 by 90 degrees in a horizontal plane to extend laterally rather than rearward toward the prime mover 106. The prime mover output shaft 140 is also oriented laterally, parallel with the input shaft 144 so that each shaft can have fixed therewith a pulley in line with the pulley of the other, and a belt can be wrapped around both pulleys to establish power transmission drive from the prime mover 106 to the fixed gearbox 146. The belt and pulleys can be smooth V-belts, ribbed belts, toothed belts, etc. Further a chain and sprockets may be used in lieu of the belt and pulleys, as belts and chains are both examples of flexible endless drive members. In some constructions, the belt drive 790 can serve as an overload device and/or a speed reduction device.

Figure 25:
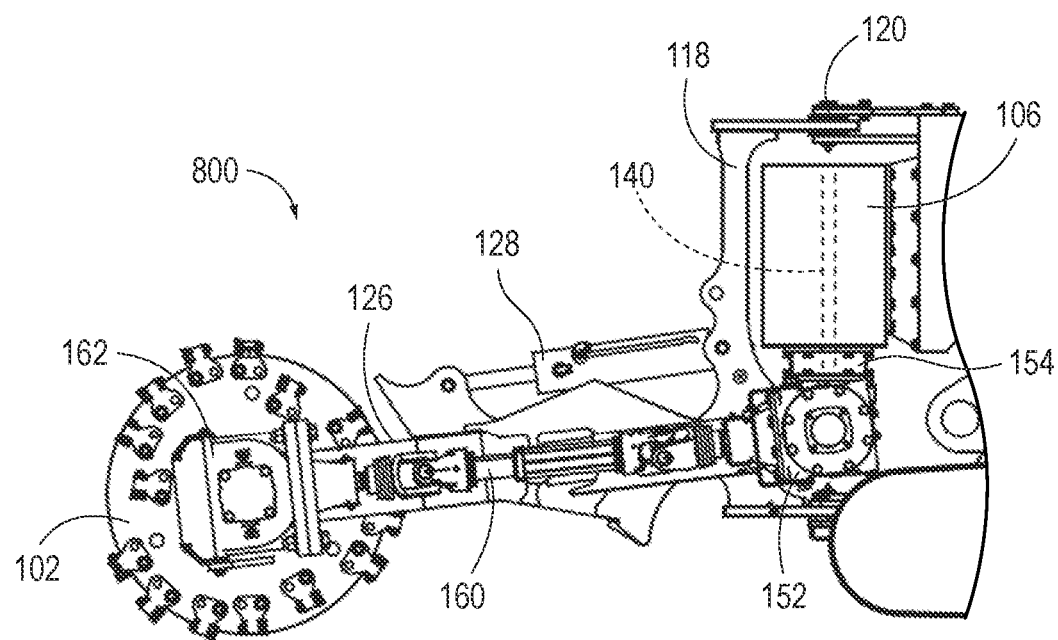
FIG. 25 is a side elevation view of a stump cutter according to an eighth embodiment of the present disclosure.
Figure 26:
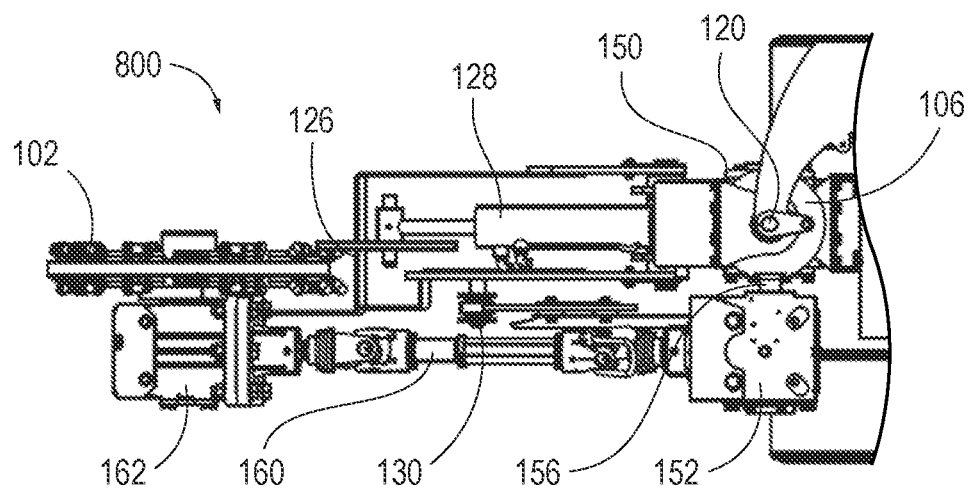
FIG. 26 is a plan view of the stump cutter of FIG. 25.

FIGS. 25 and 26 illustrate a stump cutter 800 of an eighth embodiment in which the prime mover 106 is oriented with a vertical output shaft 140 directly above the sweeping gearbox 150, the fixed gearbox 146 being eliminated from the driveline. Except for this distinction, which is further described below along with related supporting modifications, the stump cutter 800 conforms to the above description of the stump cutter 100 and includes the features thereof, with like reference numbers as applicable. The bearing 154, e.g., a slewing bearing configured for low speed back-and-forth oscillation, supports the gearboxes 150, 152 of the swivel gearbox assembly directly from the prime mover 106. According to this arrangement, the output of the prime mover 106 is arranged along the driveline sweep axis A (which is also the cutter wheel sweep axis as shown). In some constructions of the stump cutter 800, the prime mover 106 having the vertical output shaft 140 is an electric motor that is powered by a supply of electric current (e.g., from an on-board battery pack, fuel cell, etc.).

Figure 27:
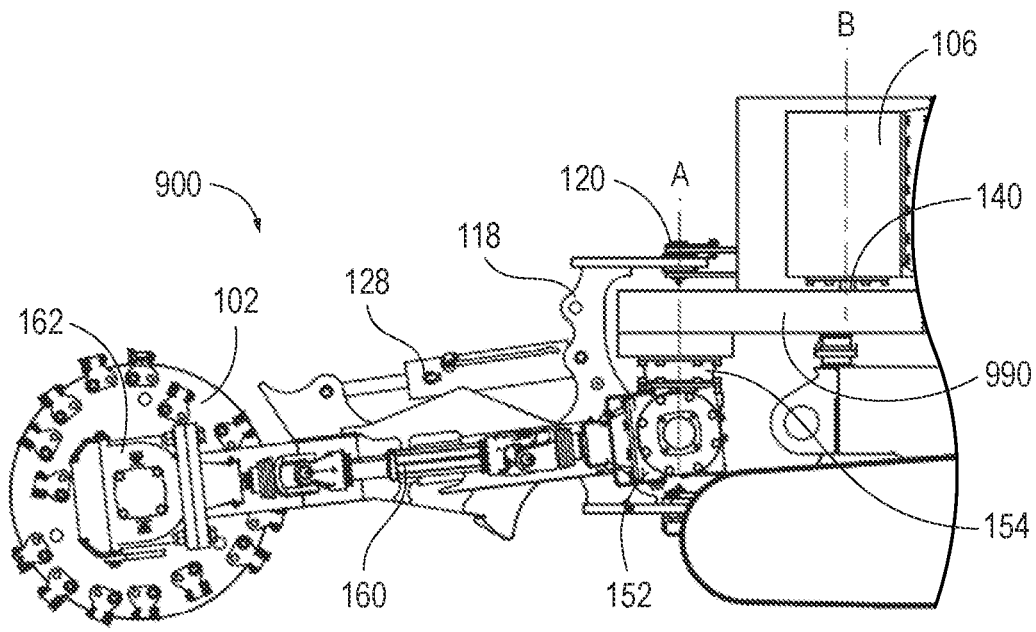
FIG. 27 is a side elevation view of a stump cutter according to a ninth embodiment of the present disclosure.
Figure 28:
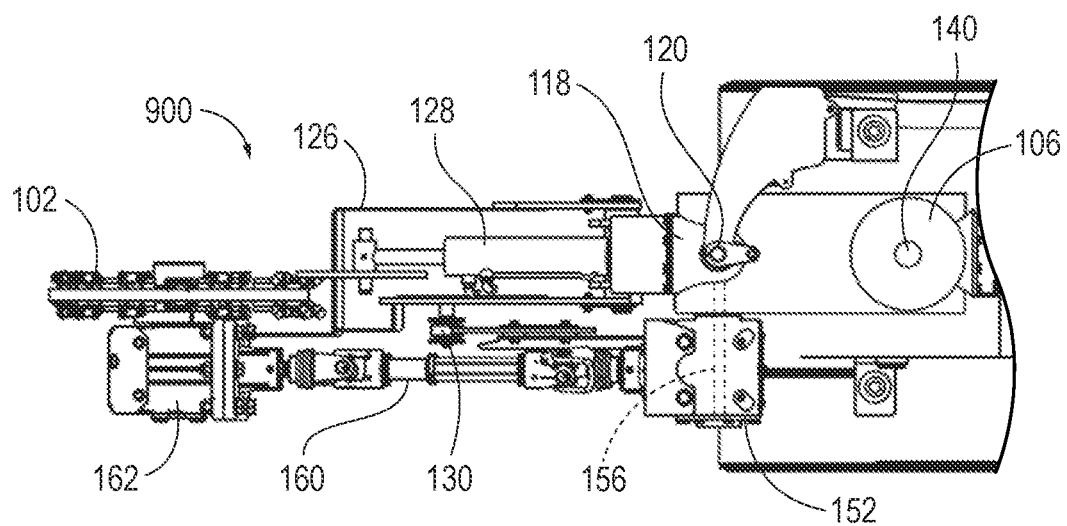
FIG. 28 is a plan view of the stump cutter of FIG. 27.

FIGS. 27 and 28 illustrate a stump cutter 900 of a ninth embodiment that is a modified version of the stump cutter 800 of FIGS. 25 and 26. In the stump cutter 900, the prime mover 106 having the vertical output shaft 140 is not directly above the sweeping gearbox 150 on the axis A. Rather, the output shaft 140 extends along the axis B parallel to and offset from the sweep axis A. An additional driveline element, e.g., a belt drive like the belt drive 790 of the stump cutter 700, connects the output shaft 140 of the prime mover 106 to the input of the gearbox 150 (which is not shown). The belt drive 990 can be a speed reduction unit. The belt drive 990 can include a belt and pulleys (shown), or may be replaced by a chain and sprockets, or a gear train in other constructions.

Figure 29A:
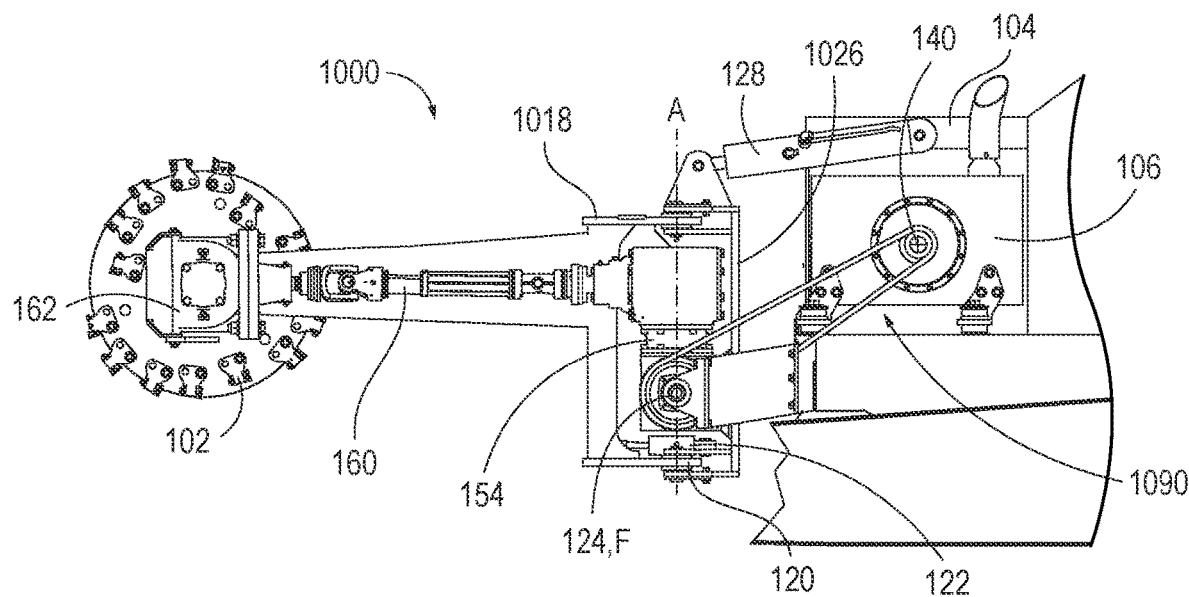
FIGS. 29A to 29C are partial side elevation views of a stump cutter according to a tenth embodiment of the present disclosure, showing the boom in three different tilt positions.
Figure 29B:
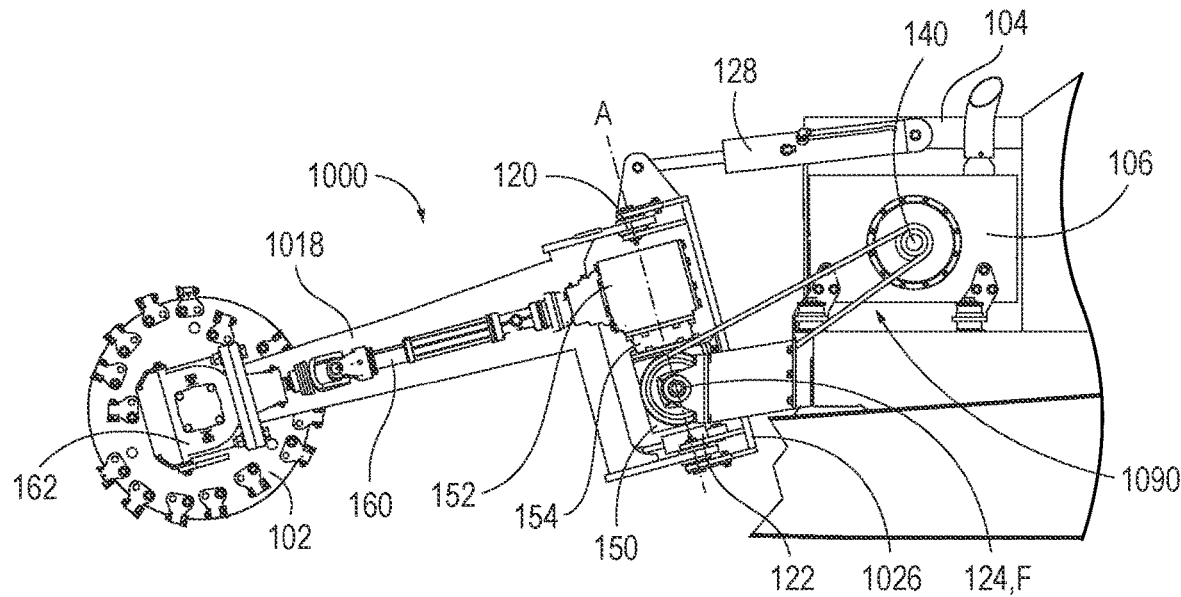
Figure 29C:
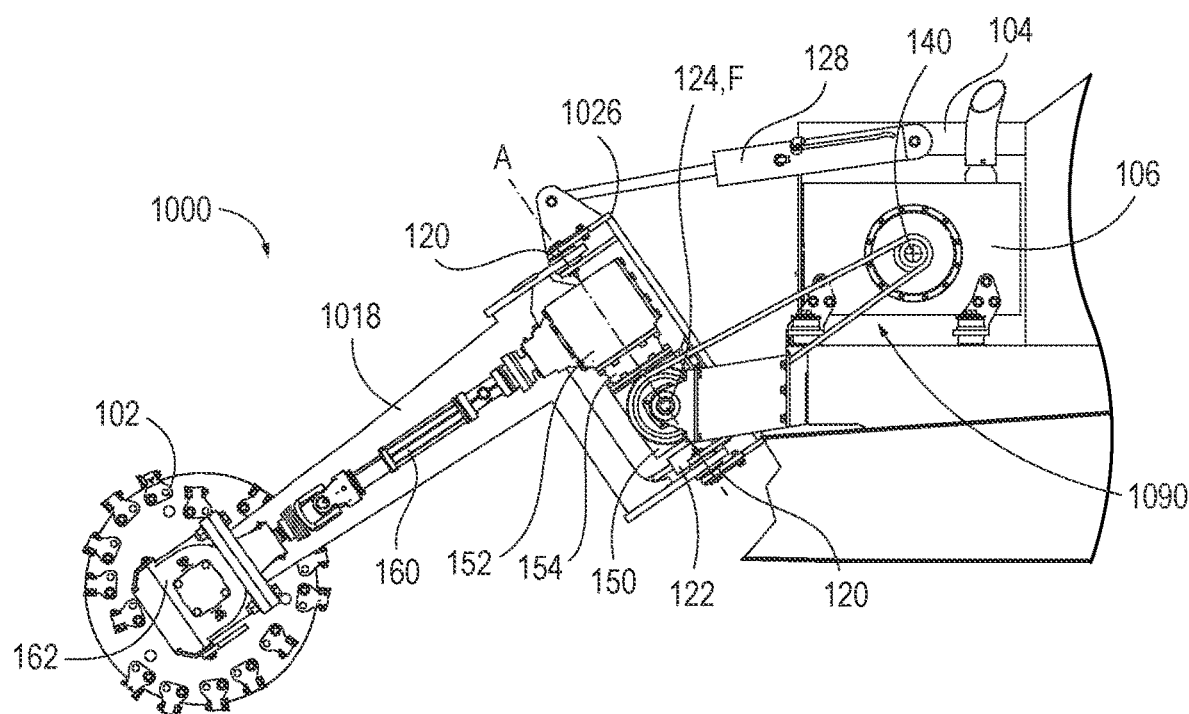
Figure 30A:
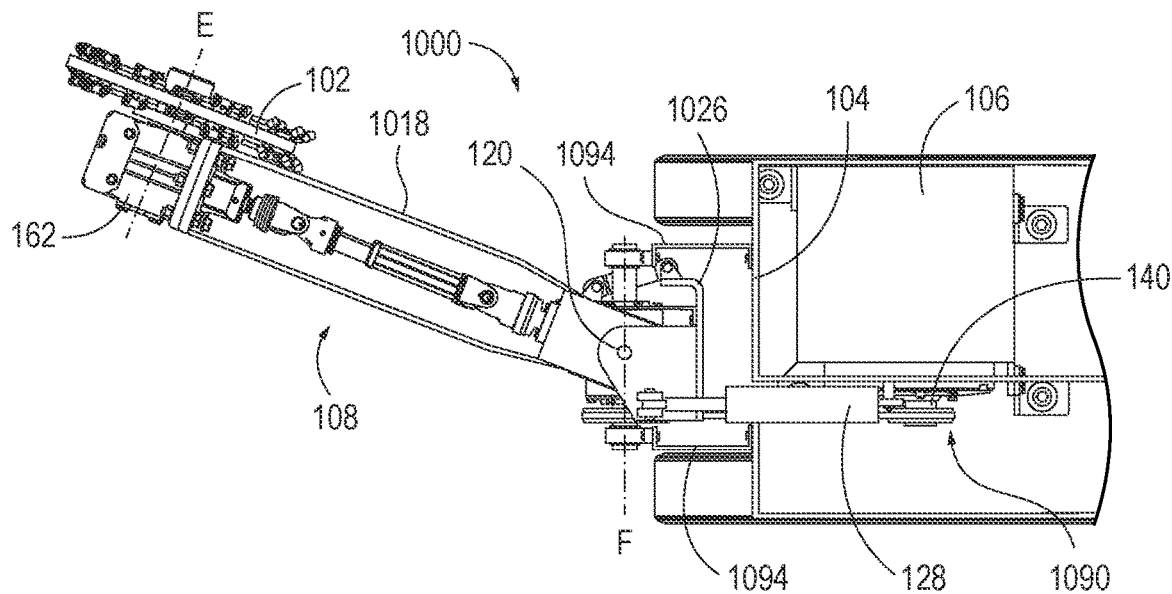
FIGS. 30A to 30C are plan views of the stump cutter of FIGS. 29A to 29C, showing the boom in three different sweep positions.
Figure 30B:
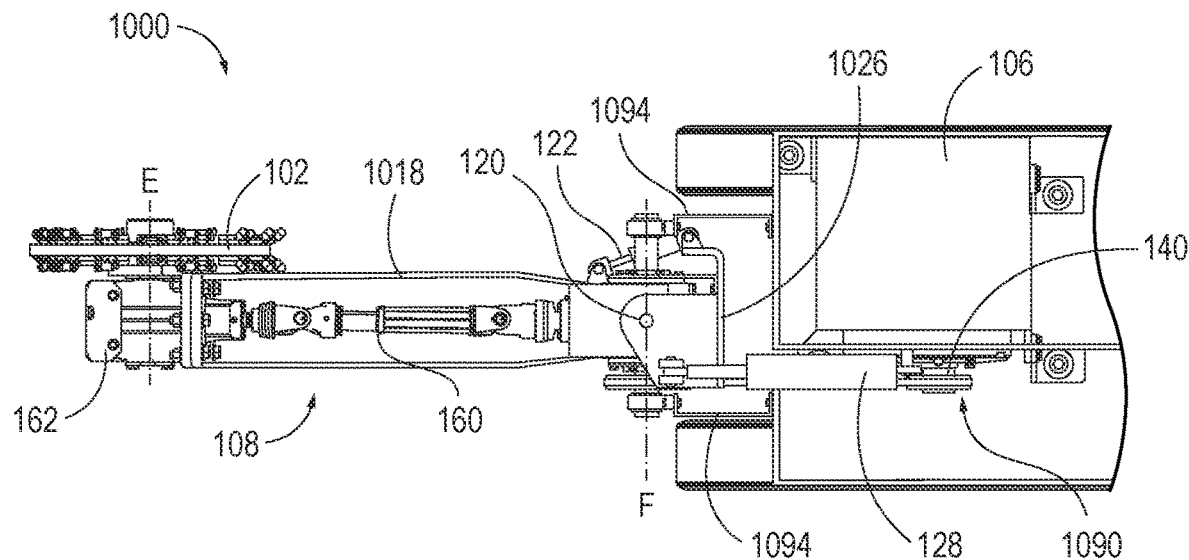
Figure 30C:
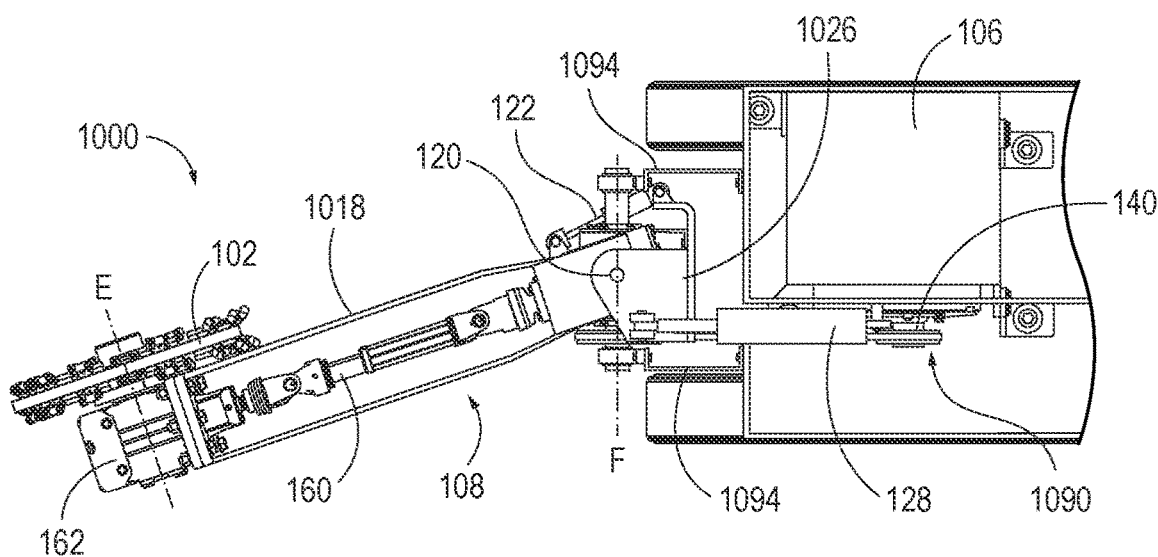

FIGS. 29A to 30C illustrate a stump cutter 1000 of a tenth embodiment in which the tilt subframe 1026 is directly pivoted on the mainframe 104, and the sweep subframe 1018 is pivotally supported by the mainframe 104 through the tilt subframe 1026. Thus, the structures supporting sweep and tilt are effectively reversed. Additionally, the fixed gearbox 146 is eliminated and the remaining gearboxes 150, 152 of the swivel gearbox assembly are vertically stacked along the driveline sweep axis A, which in this embodiment again forms the cutter wheel sweep axis as well. Except for the distinctions described herein, the stump cutter 1000 conforms to the above description of the stump cutter 100 and includes the features thereof, with like reference numbers as applicable. As shown in FIGS. 29A to 29C, tilting of the cutter wheel 102 is accomplished by tilting the entire boom 108, including the tilt and sweep subframes 1026, 1018 about the cutter wheel tilt axis F at pivot 124. As such, in the reverse of the stump cutter 100, the tilt axis F is fixed with respect to the mainframe 104, and the sweep axis A pivots with respect to the mainframe 104 in response to tilt movements. A belt drive 1090 like the belt drives 790, 990 can extend from the prime mover output shaft 140 to the input shaft of the gearbox 150, arranged along the cutter wheel tilt axis F. Both gearboxes 150, 152 tilt together relative to the mainframe 104. Although the gearbox 150 first receiving the drive power from the prime mover 106 is located below the second gearbox 152, this can be reversed in other constructions. The tilt subframe 1026 can be directly connected to the mainframe 104 or one or more fixed extensions 1094 thereon as shown. The pivot joints 120 support the sweep subframe 1018 as it extends outward to support the cutter wheel right angle gearbox 162 at a distal end thereof. The driveshaft assembly 160 may not experience changes length or angle during sweep and tilt movements of the boom. Nevertheless, the driveshaft assembly 160 can include telescoping portions and/or U-joints as illustrated. The mechanical driveline including the driveshaft assembly 160 extends through the sweep subframe 1018 as best shown in FIGS. 30A to 30C. For example, the sweep subframe 1018 can include at least two sides defining a cavity in which the driveshaft assembly 160 is positioned. Thus, the driveshaft assembly 160 is at least partially shielded by the boom 108 as it is located at least partially within a periphery of the boom 108, e.g., the sweep subframe 1018 thereof. FIGS. 30A to 30C illustrate the sweep range in plan view with the boom 108 in a level un-tilted orientation.

FIGS. 31-35 illustrate a stump cutter 1100 of an eleventh embodiment. Although many basic elements of the stump cutter 1100 are similar to those of the preceding description, the stump cutter 1100 represents a significant fundamental departure from these in the way in which the drive power and articulation are imparted to the boom 108. In particular, the boom 108 is supported on the mainframe 104 by a two-axis gimbal set, and the driveshaft assembly 1160 includes a CV joint 1188 within the two-axis gimbal set, the CV joint 1188 accommodating both the boom tilt movements and the boom sweep movements. The two-axis gimbal set includes a gimbal subframe 1118 pivotally supported about the sweep axis A with respect to the mainframe 104. Although the mainframe 104 is shown to include a hollow box portion for supporting the gimbal subframe 1118 at upper and lower pivot joints 120 in the illustrated embodiment, other practical shapes (e.g., ring or C-shape) are optional for the mainframe 104 to support the gimbal subframe 1118 for movement about the sweep axis A. The tilt subframe 1126 is pivotally supported at the laterally-spaced pivot joints 124 about the tilt axis F with respect to the gimbal subframe 1118. The gimbal subframe 1118 is formed as a hollow rectangular box, although this is merely one example of a hollow or open-center shape that exists among others (e.g., ring or C-shape). The inboard end of the tilt subframe 1126 includes a pair of laterally-spaced attachment portions 1126A for connection at the pivot joints 124 with the gimbal subframe 1118. The attachment portions 1126A are nested within the gimbal subframe 1118 just as the gimbal subframe 1118 is in turn nested within the hollow portion of the mainframe 104 to allow two-axis boom movements with the driveshaft assembly 1160 passing through the gimbal subframe 1118.

The sweep axis A and the tilt axis F intersect each other and define a plane, rather than being spaced away from each other as in the stump cutter 100. In this limited respect, the stump cutter 1100 is similar to the stump cutter 1000 of FIGS. 29A to 30C. However, rather than right angle gearboxes accommodating the sweep and/or tilt at the inboard end of the boom 108, the stump cutter 1100 utilizes the gimbal subframe 1118 and the CV joint 1188. The sweep and tilt axes A, F intersect each other at the CV joint 1188 so that the CV joint can effectively accommodate the full range of sweep and tilt for the boom 108. Because the boom sweep and tilt are inherently limited to an effective and practical angular limit and have no need for a full 360 degrees of rotation capability, the gimbal subframe 1118 need not provide exact intersection of the axes A, F in all constructions, and instead a small offset may be provided (e.g., 100 mm or less). In cases where the sweep and tilt axes A, F do not precisely intersect to define exactly one plane, each of the sweep and tilt axes A, F may still intersect the CV joint 1188. The CV joint 1188 can be provided as a centered double cardan joint that can smoothly accommodate sweep movements, tilt movements, and combinations thereof, while maintaining constant velocity in the driveline to the cutter wheel gearbox 162. Although not required in all constructions, the illustrated construction provides the tilt subframe 1126 with a wide "L" shape in the side view and an angled gearbox 1177 at the intersection of the legs of the "L." This arrangement provides a convenient angle of attack for the cutter wheel 102, keeping the tilt subframe 1126 largely behind an approach direction when cutting a stump.

Figure 31:
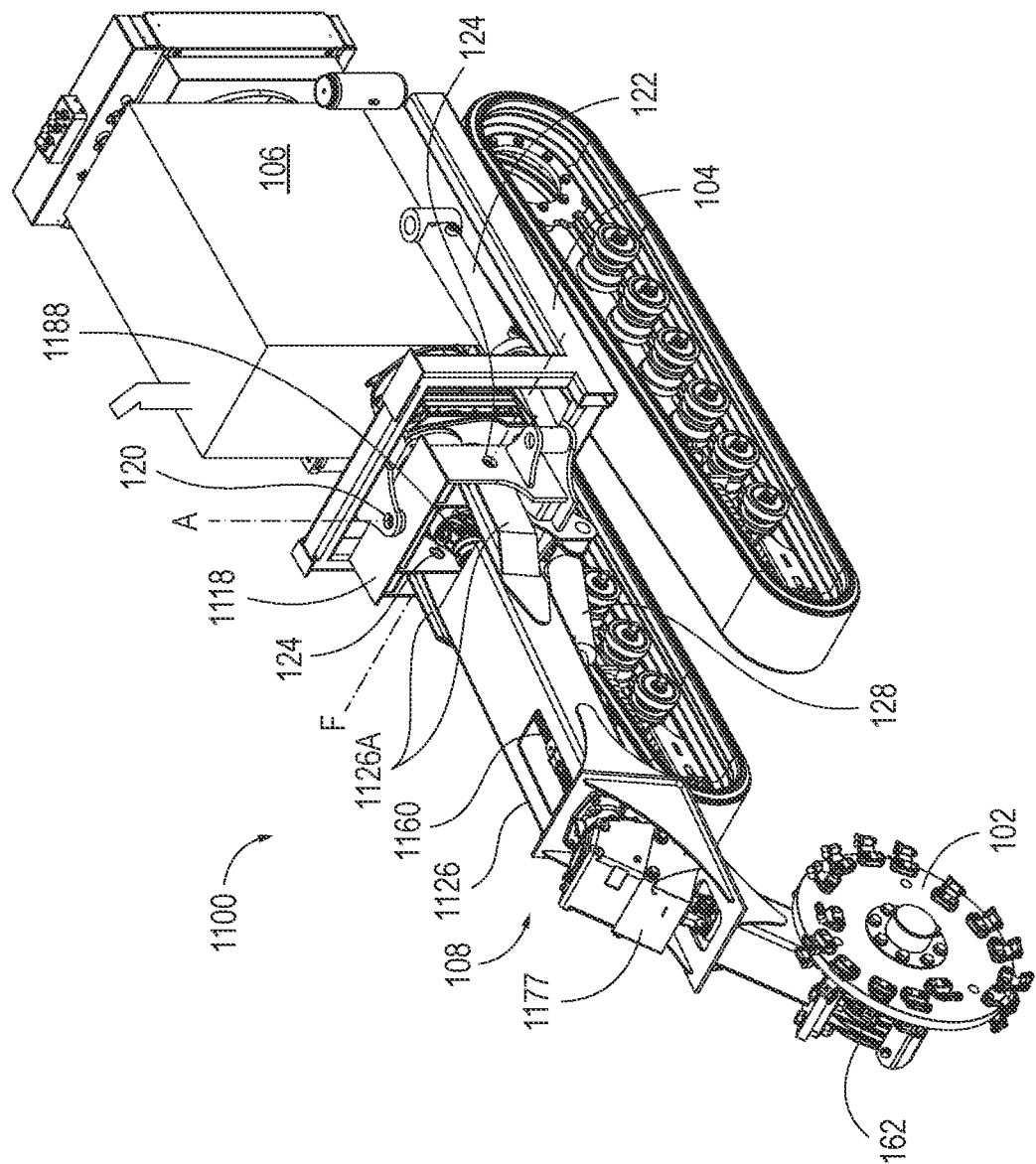
FIG. 31 is a perspective view of a stump cutter according to an eleventh embodiment of the present disclosure, including a gimbal and CV joint. Numerous housings, covers, and shielding pieces are removed to reveal the underlying mechanicals.
Figure 32A:
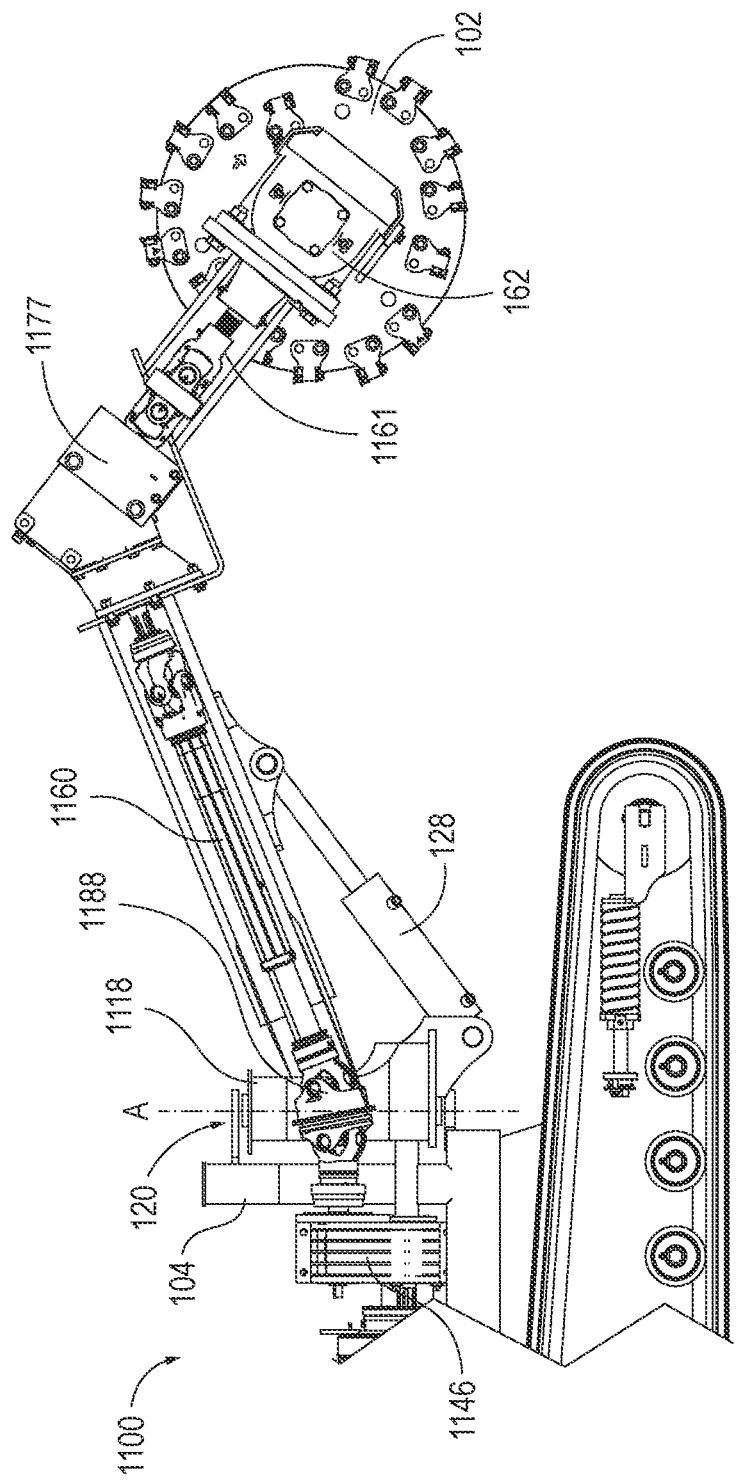
FIG. 32A is a side elevation view of the stump cutter of FIG. 31 with the boom tilted upward.
Figure 32B:
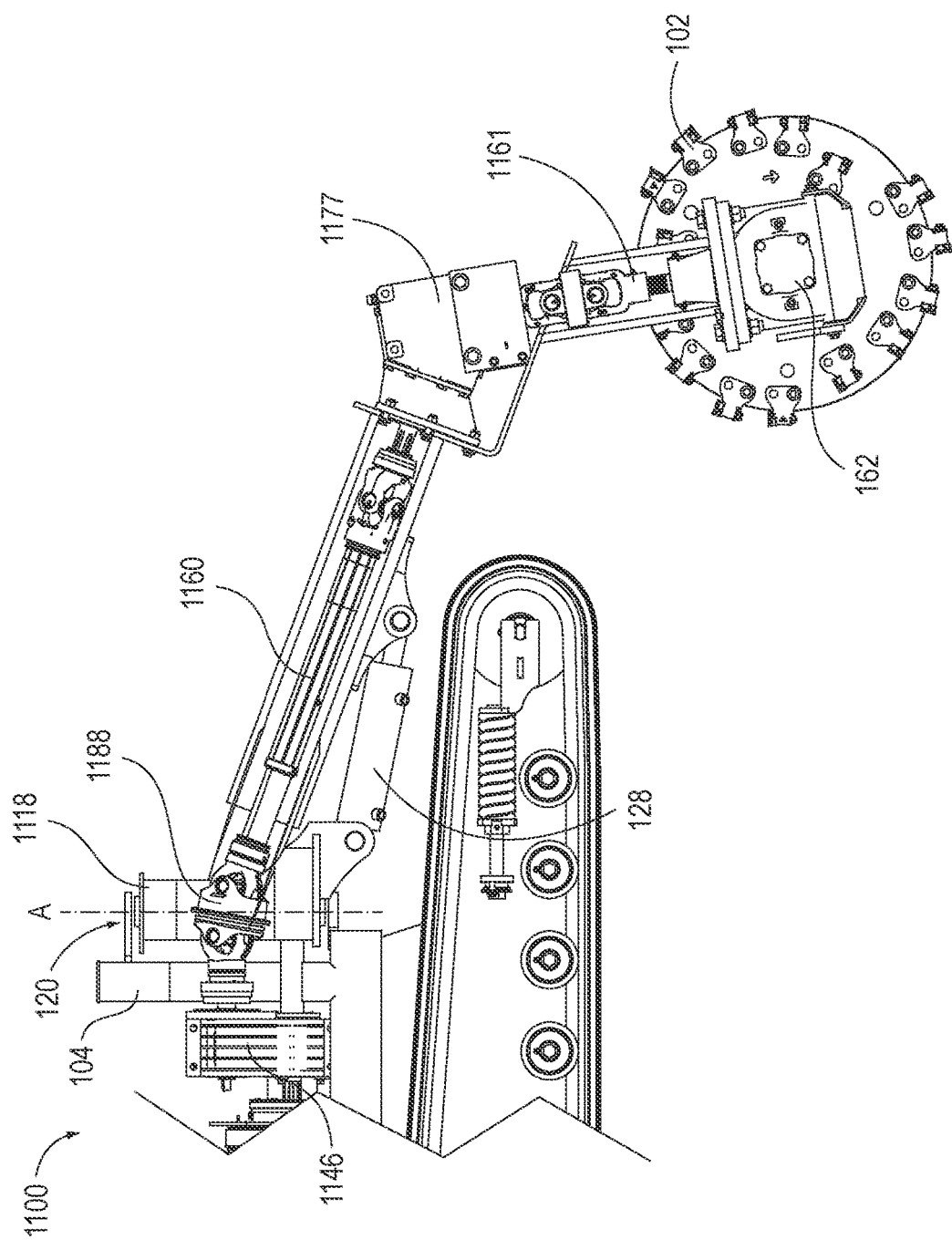
FIG. 32B is a side elevation view of the stump cutter of FIG. 31 with the boom tilted downward.
Figure 33A:
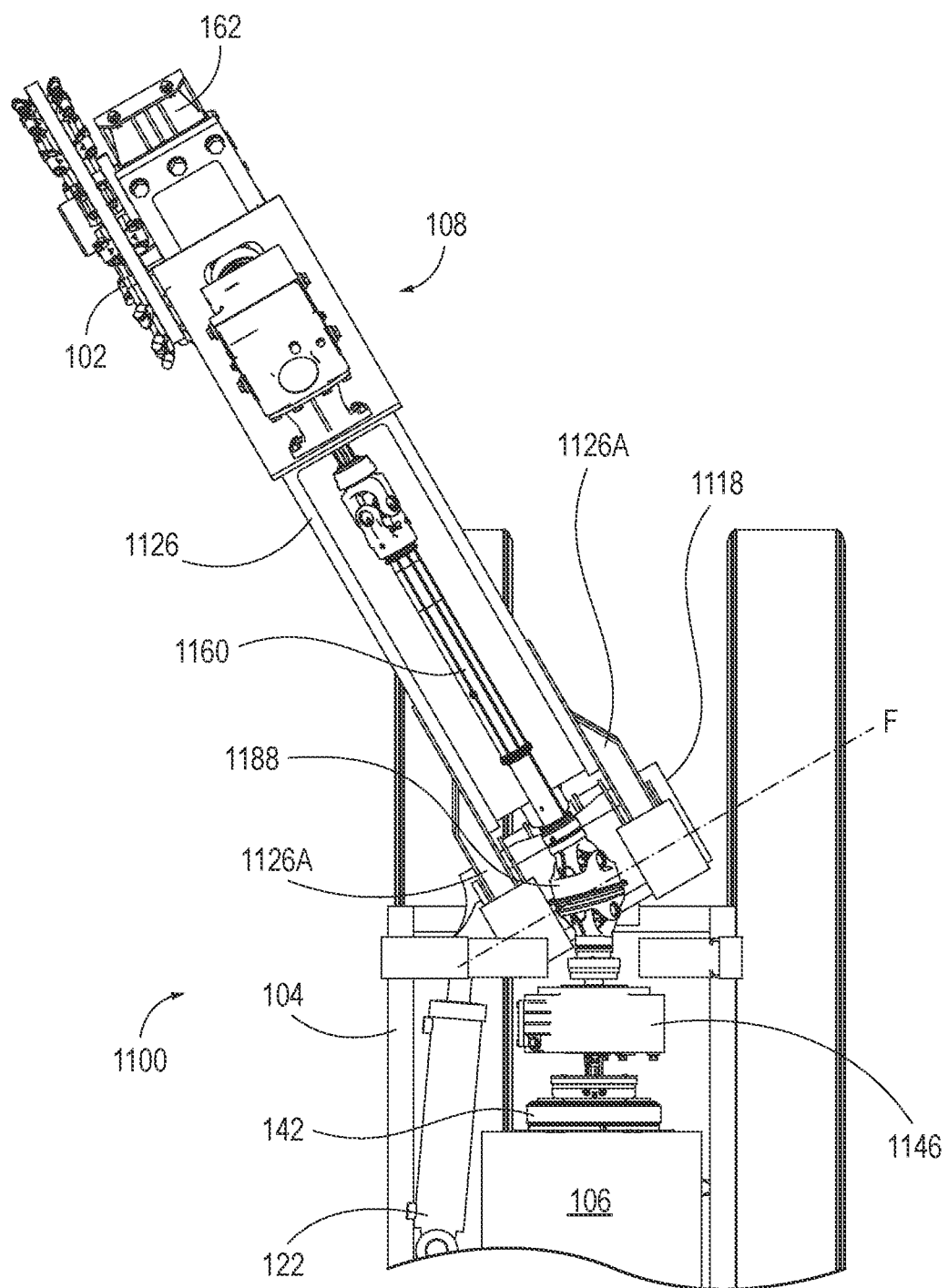
FIG. 33A is a plan view of the stump cutter of FIG. 31 with the boom swung to a first side.
Figure 33B:
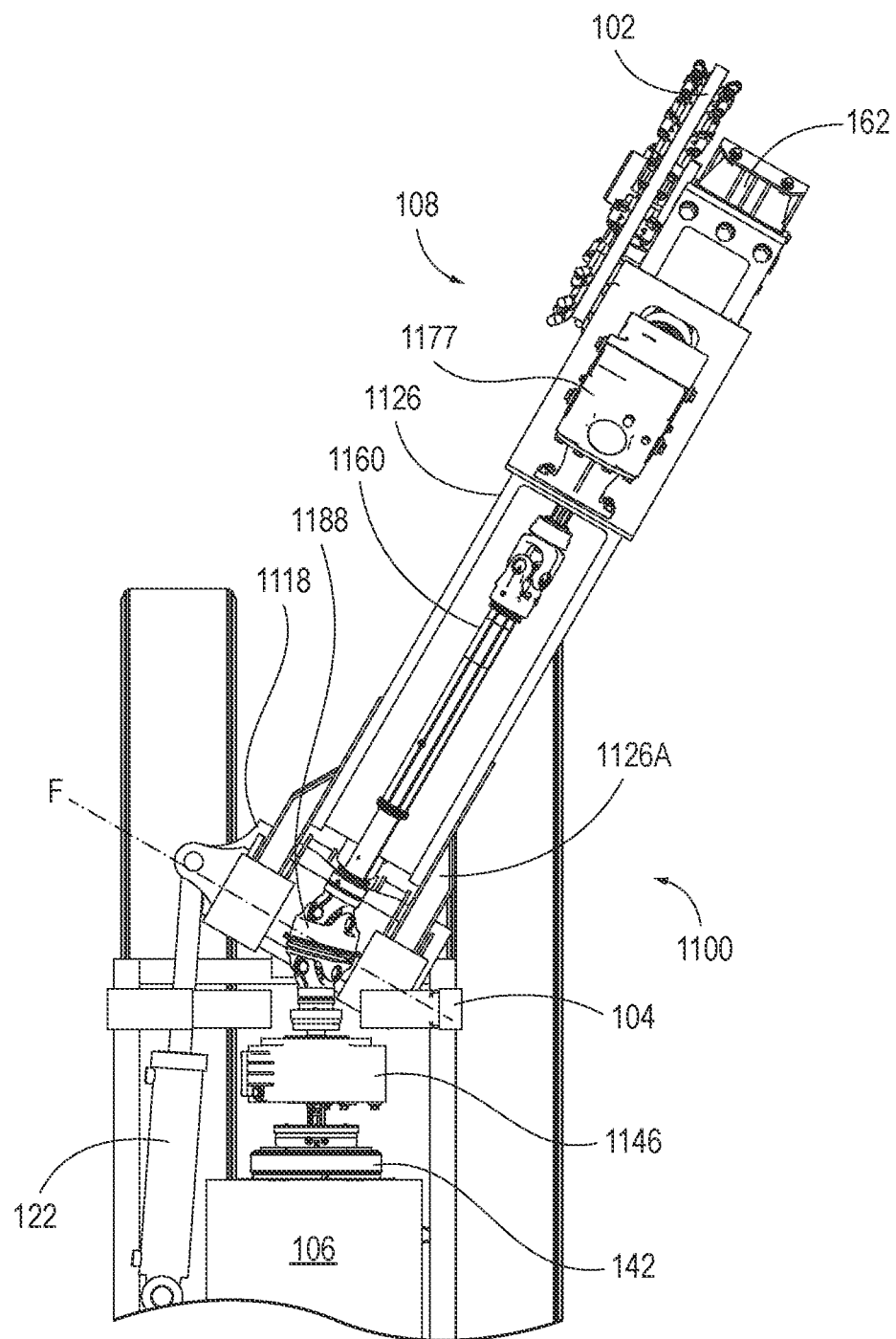
FIG. 33B is a plan view of the stump cutter of FIG. 31 with the boom swung to a second side.
Figure 34:
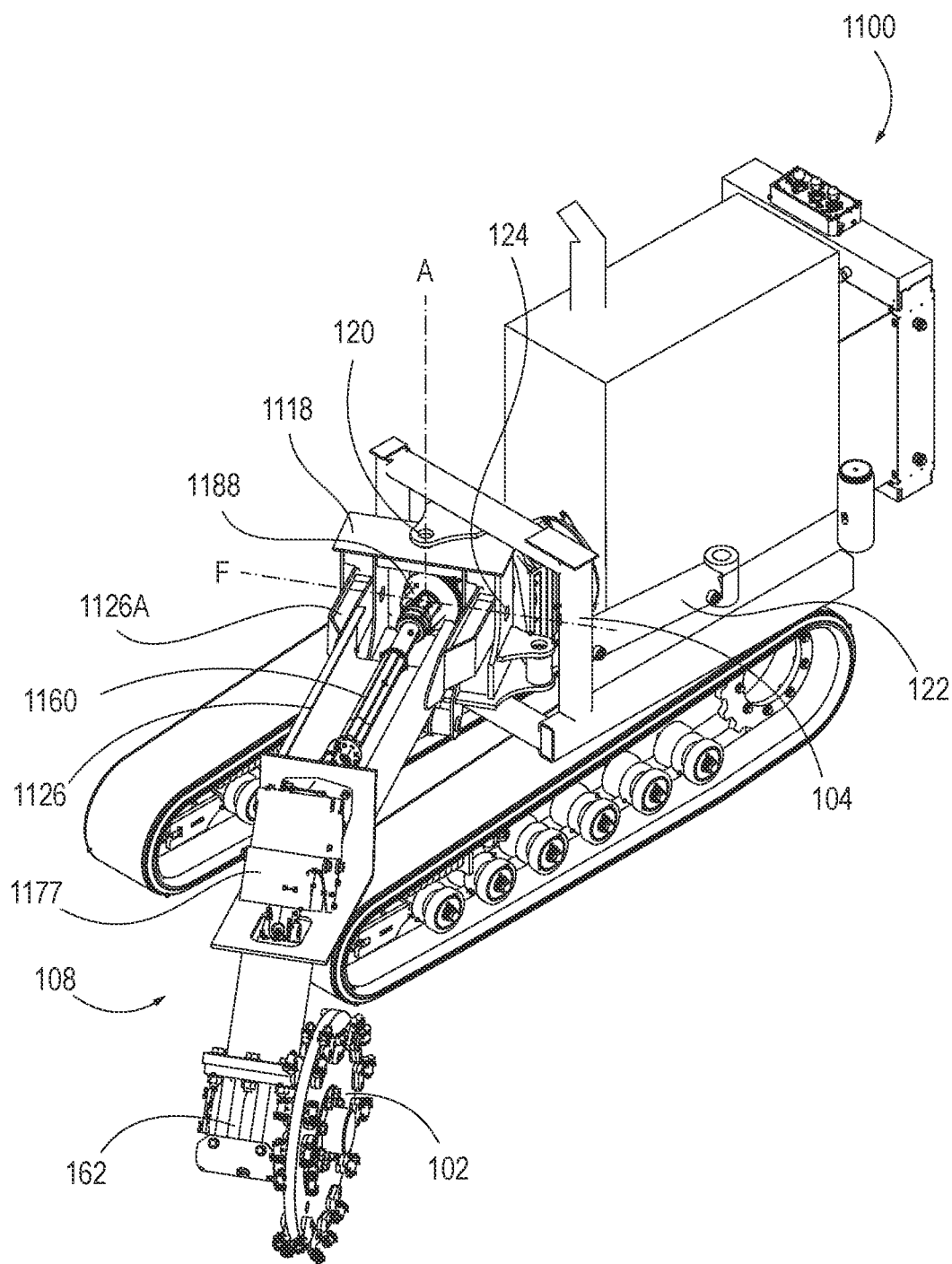
FIG. 34 is a perspective view of the stump cutter of FIG. 31 with the boom swung to the first side.
Figure 35:
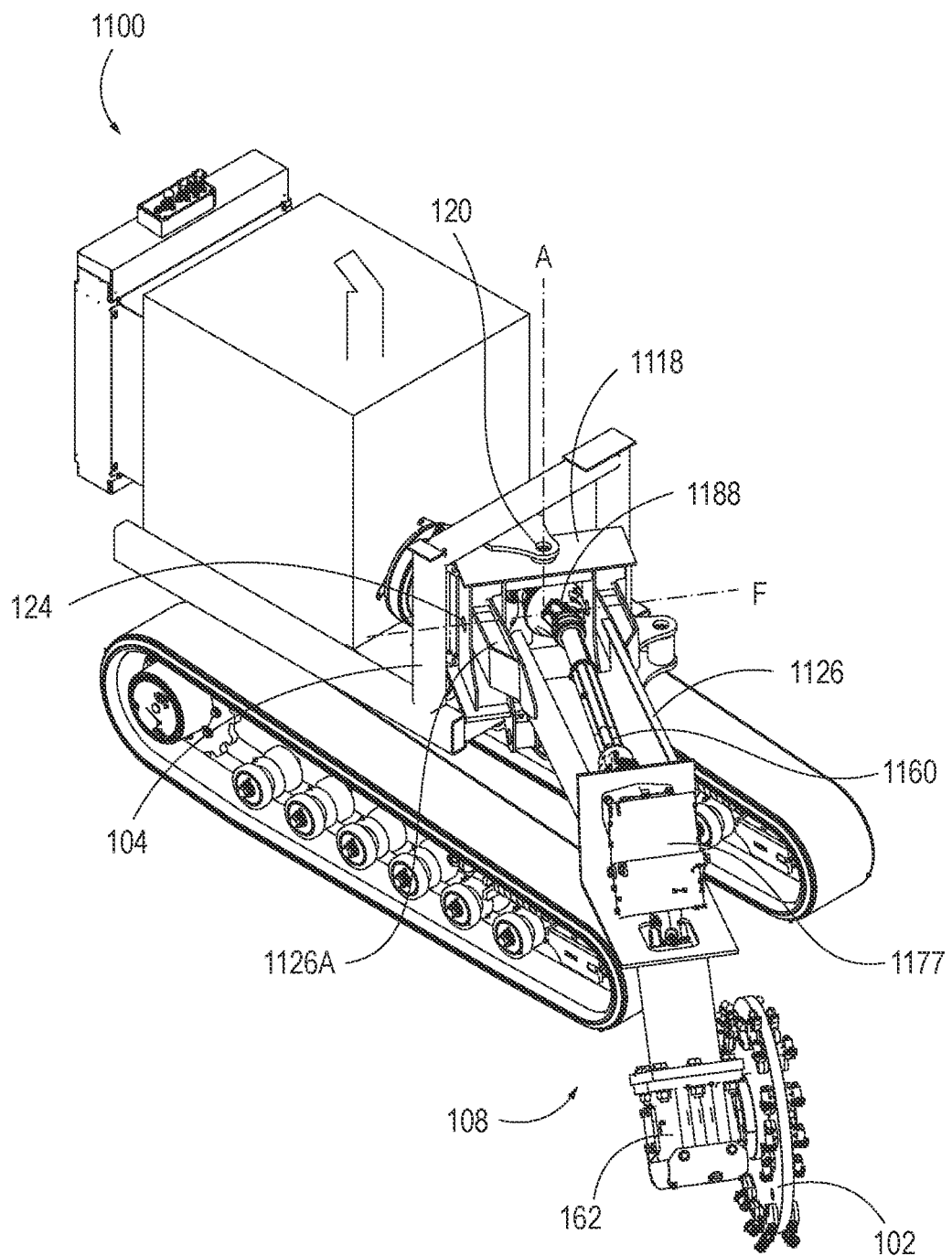
FIG. 35 is a perspective view of the stump cutter of FIG. 31 with the boom swung to the second side.

The prime mover 106 can drive the driveshaft assembly 1160, including the CV joint 1118 from a fixed gearbox 1146. A clutch 142 can be positioned between the prime mover 106 and the gearbox 1146 and the gearbox 1146 can provide a speed reduction. The gearbox 1146 can have parallel or concentric input and output axes. For aiding assembly, the driveshaft assembly 1160 can be variable-length or telescoping. However, the driveline length does not change as the cutter wheel 102 moves throughout its range of travel. Between the angled gearbox 1177 and the final drive cutter wheel gearbox 162, a second driveshaft 1161 is provided, and the second driveshaft 1161 may also be fixed-length. Each of the driveshaft assembly 1160 and the second driveshaft 1161 can include a U-joint for the sake of convenience, although articulation is effectively prohibited during operation. The mechanical driveline including the driveshaft assembly 1160 and/or the second driveshaft 1161 extends through the tilt subframe 1126 as best shown in FIG. 31 (portions of the tilt subframe 1126 being removed for illustration purposes in the later figures). For example, the tilt subframe 1126 can include at least two sides defining a cavity in which at least one section of the mechanical driveline is positioned. Thus, the mechanical driveline is at least partially shielded by the boom 108 as it is located at least partially within a periphery of the boom 108, e.g., the tilt subframe 1126 thereof. It is noted that the illustrated example shows the mainframe 104 supporting the gimbal subframe 1118 about the sweep axis A, although the construction may be effectively reversed or turned on its side in another construction so that the mainframe 104 supports the gimbal subframe 1118 about the tilt axis F and the cutter wheel 102 is in turn supported by an elongated sweep subframe. It is further noted that, to the extent that it is found desirable for any reason, the sweep axis A may deviate from true vertical, just as the tilt axis F may deviate from true horizontal.

Although the invention has been described in detail with reference to certain preferred embodiments, variations and modifications exist within the scope and spirit of one or more independent aspects of the invention as described.

What is claimed is:

1. A stump cutter comprising:
    a boom-mounted cutter wheel rotatable about a cutter wheel axis, wherein the cutter wheel is supported by a boom for sweep movements about a vertical cutter wheel sweep axis so that the cutter wheel sweeps along an arcuate path within a horizontal plane, and wherein the cutter wheel is supported by the boom for tilt movements about a horizontal cutter wheel tilt axis so that the cutter wheel tilts along an arcuate path within a vertical plane;
    a prime mover configured to drive the cutter wheel about the cutter wheel axis; and
    a mechanical driveline configured to provide power transmission from the prime mover to the cutter wheel, the mechanical driveline including
        a final drive cutter wheel gearbox positioned along the cutter wheel axis, and
        a swivel gearbox assembly including two right angle gearboxes joined with a swivel joint therebetween, wherein the swivel joint between the two right angle gearboxes forms a driveline swivel axis,
        wherein a downstream one of the two right angle gearboxes includes an output shaft connected to an input shaft of the final drive cutter wheel gearbox.

2. The stump cutter of claim 1, wherein the prime mover includes an output shaft extending along a horizontal axis, the stump cutter further comprising a right angle gearbox configured to pivotally support the swivel gearbox assembly about the driveline swivel axis and to convey power from the prime mover output shaft to an input shaft of an upstream one of the two right angle gearboxes of the swivel gearbox assembly.

3. The stump cutter of claim 1, wherein the driveline swivel axis is coaxial with the cutter wheel sweep axis.

4. The stump cutter of claim 1, wherein the prime mover includes an output shaft extending vertically along the driveline swivel axis.

5. The stump cutter of claim 1, wherein the prime mover includes an output shaft extending vertically parallel to and offset from the driveline swivel axis.

6. The stump cutter of claim 1, wherein the driveline swivel axis accommodates one of the movements of the group consisting of: the cutter wheel tilt movements and the cutter wheel sweep movements, while an upstream one of the two right angle gearboxes is pivotally supported on the stump cutter to define another driveline swivel axis accommodating the other one of the movements of the group consisting of: the cutter wheel tilt movements and the cutter wheel sweep movements.

7. The stump cutter of claim 6, wherein the upstream one of the two right angle gearboxes is pivotally supported on a right angle gearbox that is fixed with respect to the prime mover.

8. The stump cutter of claim 6, wherein at least one of the driveline swivel axes is/are not aligned with either of the cutter wheel sweep axis or the cutter wheel tilt axis, and wherein the mechanical driveline between the swivel gearbox assembly and the final drive cutter wheel gearbox includes at least one joint.

9. The stump cutter of claim 1, wherein the prime mover is an internal combustion engine including an output shaft extending horizontally to an additional right angle gearbox on which the swivel gearbox assembly is pivotally mounted.

10. The stump cutter of claim 1, wherein the driveline swivel axis accommodates one of the movements of the group consisting of: the cutter wheel tilt movements and the cutter wheel sweep movements, the mechanical driveline of the stump cutter further comprising a constant velocity joint accommodating the other of the movements of the group consisting of: the cutter wheel tilt movements and the cutter wheel sweep movements.

11. The stump cutter of claim 1, wherein the final drive cutter wheel gearbox is swivel-mounted on the boom, wherein a driveline alignment structure extending along the mechanical driveline between the swivel gearbox assembly and the final drive cutter wheel gearbox includes a sliding joint.

12. The stump cutter of claim 1, wherein the final drive cutter wheel gearbox is fixed-mounted on the boom, wherein a driveline alignment structure extending along the mechanical driveline between the swivel gearbox assembly and the final drive cutter wheel gearbox includes a sliding joint and a pivot joint.

13. The stump cutter of claim 1, wherein the boom supporting the cutter wheel includes a sweep subframe pivotally coupled to a mainframe of the stump cutter about the sweep axis, and the boom further includes a tilt subframe pivotally coupled to the sweep subframe about the tilt axis.

14. The stump cutter of claim 1, wherein the mechanical driveline includes one or both of: a speed-reduction unit and a clutch between the prime mover and an input shaft of an upstream one of the two right angle gearboxes.

15. The stump cutter of claim 1, wherein the final drive cutter wheel gearbox and the swivel gearbox assembly are stressed frame elements of the boom on which the cutter wheel is supported.

16. A stump cutter comprising:
    a mainframe;
    an engine supported on the mainframe such that a crankshaft of the engine extends horizontally when the stump cutter is situated in an operative position on a horizontal ground surface;
    a cutter wheel support structure extending from the mainframe to support a cutter wheel at a distance from the mainframe, the cutter wheel support structure having:
        a sweep subframe pivotally connected to the mainframe defining a vertical cutter wheel sweep axis, and
        a tilt subframe pivotally connected to the sweep subframe defining a horizontal cutter wheel tilt axis on one end and with a cutter wheel right angle gearbox mounted to the opposite end with an output shaft for supporting the cutter wheel and an input shaft;

a jointed driveline having:
- a first right angle gearbox fixedly secured with respect to the engine and having a horizontal input shaft connected to the engine crankshaft, wherein a vertical output shaft of the first right angle gearbox defines a driveline sweep axis parallel to the cutter wheel sweep axis,
- a second right angle gearbox pivotally mounted on the first right angle gearbox about the driveline sweep axis, wherein the second right angle gearbox includes a horizontal output shaft, defining a driveline tilt axis parallel to the cutter wheel tilt axis, and
- a third right angle gearbox pivotally mounted on the second right angle gearbox about the driveline tilt axis, wherein the third right angle gearbox includes an output shaft extending in a direction toward the cutter wheel right angle gearbox; and a driveshaft configured to provide power transmission from the output shaft of the third right angle gearbox to the input shaft of the cutter wheel right angle gearbox;

a gearbox alignment structure extending along the driveshaft and having a first portion fixed to the cutter wheel right angle gearbox and a second portion fixed to the third right angle gearbox and configured to limit misalignment between the input shaft of the cutter wheel right angle gearbox and the output shaft of the third right angle gearbox so that the orientation of the second right angle gearbox relative to the first right angle gearbox about the driveline sweep axis, and the orientation of the third right angle gearbox relative to the second right angle gearbox about the driveline tilt axis are controlled by the combination of the driveshaft and the gearbox alignment structure when the cutter wheel support structure moves relative to the mainframe about the cutter wheel sweep and tilt axes.

17. The stump cutter of claim 16, wherein the driveline tilt axis and the cutter wheel tilt axis are offset.

18. The stump cutter of claim 16, further comprising a clutch between the engine and the first right angle gearbox, the engine crankshaft being selectively connected to the input shaft of the first right angle gearbox through the clutch.

19. The stump cutter of claim 16, wherein the cutter wheel right angle gearbox is fixed-mounted on the tilt subframe, wherein the gearbox alignment structure includes a sliding joint and a pivot joint.

20. The stump cutter of claim 16, wherein the second right angle gearbox is pivotally mounted on the first right angle gearbox by a driveline swivel shaft formed as one integral piece comprising both the output shaft of the first right angle gearbox and the input shaft of the second right angle gearbox, and further by at least one bearing, and
wherein the third right angle gearbox is pivotally mounted on the second right angle gearbox by a driveline tilt shaft formed as one integral piece comprising both the output shaft of the second right angle gearbox and the input shaft of the third right angle gearbox, and further by at least one bearing.

21. A stump cutter comprising:
a prime mover supported above a ground surface by a mainframe of the stump cutter;
a cutter wheel configured to be driven about a cutter wheel axis by the prime mover, wherein the cutter wheel is supported for sweep movements about a vertical cutter wheel sweep axis so that the cutter wheel sweeps along an arcuate path within a horizontal plane, and wherein the cutter wheel is supported for tilt movements about a horizontal cutter wheel tilt axis so that the cutter wheel tilts along an arcuate path within a vertical plane;
a mechanical driveline between the prime mover and the cutter wheel, the mechanical driveline including
- a first right angle gearbox including a vertical output shaft defining a driveline sweep axis parallel to the cutter wheel sweep axis,
- a second right angle gearbox pivotally mounted on the first right angle gearbox about the driveline sweep axis, the second right angle gearbox including a horizontal output shaft defining a driveline tilt axis,
- a third right angle gearbox mounted on the second right angle gearbox and including an output shaft, and
- a cutter wheel right angle gearbox having an output shaft extending along the cutter wheel axis, the cutter wheel right angle gearbox having an input shaft connected to the output shaft of the third right angle gearbox.

22. The stump cutter of claim 21, wherein the vertical output shaft of the first right angle gearbox also forms an input shaft of the second right angle gearbox, and wherein the horizontal output shaft of the second right angle gearbox also forms an input shaft of the third right angle gearbox.

23. The stump cutter of claim 21, further comprising a sweep subframe pivotally connected to the mainframe to define the cutter wheel sweep axis, and a tilt subframe pivotally connected to the sweep subframe to define the cutter wheel tilt axis, the tilt subframe supporting the cutter wheel right angle gearbox at an end opposite the cutter wheel tilt axis.

24. The stump cutter of claim 21, wherein the cutter wheel tilt axis is offset from the driveline tilt axis, the stump cutter further comprising
- a jointed driveshaft connecting the output of the third right angle gearbox to the input of the cutter wheel right angle gearbox; and
- a gearbox alignment structure extending along the jointed driveshaft and having a first portion fixed to the cutter wheel right angle gearbox and a second portion fixed to the third right angle gearbox and configured to limit misalignment between the input shaft of the cutter wheel right angle gearbox and the output shaft of the third right angle gearbox.

25. The stump cutter of claim 21, wherein the mechanical driveline further incudes a clutch operable to selectively connect an output of the prime mover with an input of the first right angle gearbox.

* * * * *